US009897719B2

United States Patent
Stephenson et al.

(10) Patent No.: US 9,897,719 B2
(45) Date of Patent: Feb. 20, 2018

(54) OPTIMIZATION OF NEUTRON-GAMMA TOOLS FOR INELASTIC-GAMMA RAY LOGGING

(75) Inventors: Kenneth E. Stephenson, Plainsboro, NJ (US); David Rose, Sugar Land, TX (US); Avtandil Tkabladze, Sugar Land, TX (US); Christian Stoller, Princeton Junction, NJ (US); Donna Simonetti, Hamilton, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 788 days.

(21) Appl. No.: 13/321,933

(22) PCT Filed: May 21, 2010

(86) PCT No.: PCT/US2010/035718
§ 371 (c)(1),
(2), (4) Date: Apr. 19, 2012

(87) PCT Pub. No.: WO2010/135618
PCT Pub. Date: Nov. 25, 2010

(65) Prior Publication Data
US 2012/0197529 A1   Aug. 2, 2012

Related U.S. Application Data

(60) Provisional application No. 61/180,547, filed on May 22, 2009.

(51) Int. Cl.
*G01V 5/10* (2006.01)

(52) U.S. Cl.
CPC .............. *G01V 5/104* (2013.01); *G01V 5/101* (2013.01)

(58) Field of Classification Search
CPC ........ G01V 5/101; G01V 5/102; G01V 5/104; G01V 5/105; G01V 5/107; G01V 5/108; G01V 5/125
(Continued)

(56) References Cited

U.S. PATENT DOCUMENTS 2,956,163 A    10/1960  Baker
2,958,780 A *  11/1960  Dewan .......................... 376/108
(Continued)

OTHER PUBLICATIONS

International Preliminary Report on Patentability dated Dec. 1, 2011 for corresponding PCT Application No. PCT/US2010/035718 filed May 21, 2010.
(Continued)

*Primary Examiner* — David Porta
*Assistant Examiner* — Djura Malevic
(74) *Attorney, Agent, or Firm* — Michael Dae

(57) ABSTRACT

Systems, methods, and devices for inelastic gamma-ray logging are provided. In one embodiment, such a method includes emitting neutrons into a subterranean formation from a downhole tool to produce inelastic gamma-rays, detecting a portion of the inelastic gamma-rays that scatter back to the downhole tool to obtain an inelastic gamma-ray signal, and determining a property of the subterranean formation based at least in part on the inelastic gamma-ray signal. The inelastic gamma-ray signal may be substantially free of epithermal and thermal neutron capture background.

25 Claims, 13 Drawing Sheets

(58) Field of Classification Search
USPC ... 250/261, 264, 269.2, 269.4, 269.6, 269.8, 250/266
See application file for complete search history.

(56) References Cited

U.S. PATENT DOCUMENTS

| | | | |
|---|---|---|---|
| 3,294,972 A | 12/1966 | Youmans | |
| 3,312,823 A * | 4/1967 | Bonner | G01T 1/24 250/269.6 |
| 3,691,378 A * | 9/1972 | Hopkinson et al. | 250/264 |
| 3,842,265 A | 10/1974 | Pitts, Jr. | |
| 3,869,608 A * | 3/1975 | Scherbatskoy | 376/160 |
| 3,885,160 A * | 5/1975 | Dillingham | 376/191 |
| 3,930,154 A * | 12/1975 | Scott | G01V 5/102 250/262 |
| 4,581,532 A * | 4/1986 | Givens et al. | 250/266 |
| 4,717,825 A * | 1/1988 | Smith et al. | 250/256 |
| 4,973,839 A * | 11/1990 | Nelligan | 250/269.4 |
| 5,025,151 A * | 6/1991 | Melcher | G01V 5/101 250/256 |
| 5,293,410 A | 3/1994 | Chen et al. | |
| 5,313,504 A * | 5/1994 | Czirr | 376/153 |
| 5,374,823 A | 12/1994 | Odom | |
| 5,532,482 A | 7/1996 | Stephenson | |
| 5,608,215 A * | 3/1997 | Evans | 250/269.6 |
| 5,804,820 A * | 9/1998 | Evans et al. | 250/269.6 |
| 5,900,627 A * | 5/1999 | Odom et al. | 250/269.7 |
| 6,005,244 A | 12/1999 | Vaeth et al. | |
| 6,207,953 B1 | 3/2001 | Wilson | |
| 6,297,507 B1 * | 10/2001 | Chen et al. | 250/370.11 |
| 6,944,548 B2 * | 9/2005 | Radtke et al. | 702/8 |
| 7,139,350 B2 | 11/2006 | Tiller et al. | |
| 7,365,308 B2 | 4/2008 | Trcka et al. | |
| 7,408,150 B1 | 8/2008 | Flaum et al. | |
| 7,432,499 B2 * | 10/2008 | Edwards et al. | 250/259 |
| 7,432,500 B2 * | 10/2008 | Sale | 250/269.3 |
| 7,880,134 B2 * | 2/2011 | Kirkwood et al. | 250/269.6 |
| 7,950,473 B2 * | 5/2011 | Sugiura | 175/45 |
| 7,999,220 B2 * | 8/2011 | Odom | 250/269.3 |
| 8,049,164 B2 * | 11/2011 | Kirkwood et al. | 250/269.6 |
| 8,076,634 B2 * | 12/2011 | Stoller | 250/269.1 |
| 8,269,162 B2 * | 9/2012 | Kirkwood et al. | 250/269.6 |
| 8,299,420 B2 * | 10/2012 | Stoller | 250/269.4 |
| 8,338,777 B2 * | 12/2012 | Nikitin et al. | 250/269.6 |
| 8,497,685 B2 * | 7/2013 | Sugiura | 324/346 |
| 8,521,435 B2 * | 8/2013 | Minh et al. | 702/11 |
| 8,600,115 B2 * | 12/2013 | Liu | 382/107 |
| 8,731,888 B2 * | 5/2014 | Yin et al. | 703/10 |
| 2002/0036260 A1 * | 3/2002 | Adolph | 250/269.1 |
| 2002/0130267 A1 * | 9/2002 | Odom et al. | 250/390.11 |
| 2002/0150194 A1 * | 10/2002 | Wielopolski et al. | 376/160 |
| 2002/0170348 A1 * | 11/2002 | Roscoe et al. | 73/152.02 |
| 2003/0076914 A1 | 4/2003 | Tiller et al. | |
| 2003/0178560 A1 * | 9/2003 | Odom et al. | 250/269.2 |
| 2004/0128073 A1 * | 7/2004 | Radtke et al. | 702/8 |
| 2004/0222368 A1 * | 11/2004 | Odom et al. | 250/269.2 |
| 2005/0028586 A1 * | 2/2005 | Smits et al. | 73/152.14 |
| 2005/0067160 A1 * | 3/2005 | Jacobson | 166/250.01 |
| 2006/0226351 A1 * | 10/2006 | Stoller | G01V 5/104 250/269.1 |
| 2006/0284066 A1 | 12/2006 | Jacobson | |
| 2007/0119243 A1 * | 5/2007 | Smits et al. | 73/152.14 |
| 2009/0026359 A1 * | 1/2009 | Stephenson et al. | 250/269.7 |
| 2009/0045235 A1 * | 2/2009 | Stoller | 250/269.4 |
| 2009/0114806 A1 * | 5/2009 | Kirkwood et al. | 250/269.6 |
| 2009/0114807 A1 * | 5/2009 | Kirkwood et al. | 250/269.7 |
| 2009/0210161 A1 * | 8/2009 | Duenckel et al. | 702/8 |
| 2009/0242746 A1 * | 10/2009 | Pemper et al. | 250/269.6 |
| 2009/0276158 A1 * | 11/2009 | Kirkwood et al. | 702/8 |
| 2009/0296084 A1 * | 12/2009 | Odom | 356/317 |
| 2010/0262371 A1 * | 10/2010 | Oraby | 702/8 |
| 2011/0062319 A1 * | 3/2011 | Nikitin et al. | 250/254 |
| 2011/0204217 A1 * | 8/2011 | Oraby et al. | 250/269.6 |
| 2013/0092827 A1 * | 4/2013 | Nikitin et al. | 250/254 |

OTHER PUBLICATIONS

Neuman, et al., "An Investigation of Density Derived from Pulsed Neutron Capture Measurements", SPE 56647—SPE Annual Technical Conference and Exhibition, Houston, Texas, Oct. 3-6, 1999, 8 pages.

Odom, et al., "Applications and Derivation of a New Cased-Hole Density Porosity in Shaly Sands", SPE 38699—SPE Annual Technical Conference and Exhibition, San Antonio, Texas, Oct. 5-8, 1997, 13 pages.

Odom, et al., "Improvements in a Through-Casing Pulsed-Neutron Density Log", SPE 71742—SPE Annual Technical Conference and Exhibition, New Orleans, Louisiana, 2001, 9 pages.

Odom, et al., "Log Examples with a Prototype Three-Detector Pulsed-Neutron System for Measurement of Cased-Hole Neutron and Density Porosities", SPE 71042—SPE Rocky Mountain Petroleum Technology Conference, Keystone, Colorado, May 21-23, 2001, 10 pages.

Odom, et al., "Shaly Sand Analysis using Density-Neutron Porosities from a Cased-Hole Pulsed Neutron System", SPE 55641—SPE Rocky Mountain Regional Meeting, Gillette, Wyoming, May 15-18, 1999, 10 pages.

Extended European Search Report for EP Application No. 10778447.2 dated Apr. 8, 2015.

Examination Report issued in corresponding Canadian patent application 2,763,285 dated Sep. 21, 2016. 5 pages.

International Search Report and Written opinion issued in the related PCT application PCT/US2010/035718 dated Feb. 9, 2011 (9 pages).

* cited by examiner

OPTIMIZATION OF NEUTRON-GAMMA TOOLS FOR INELASTIC-GAMMA RAY LOGGING

BACKGROUND

The present disclosure relates generally to oilfield logging and, more particularly, to oilfield logging involving inelastic gamma-ray measurements.

Many properties of a subterranean formation may be determined using different oilfield logging techniques, which may involve one or more tools having a radioisotope source. For example, to locate gas in a subterranean formation, a conventional practice combines data obtained from two tools. One of the tools is a "density" tool, which measures the electron density of the formation, and the other of the tools is a "neutron porosity" tool, which generally measures the density of hydrogen in the formation, known as the "hydrogen index (HI)." Based on measurements of formation density and hydrogen index, the porosity and pore fluid density of the formation may be determined. For a given formation fluid density, or gas saturation, a combination of a decrease in the formation density and an increase in the hydrogen index indicates an increase in the porosity of the formation. Meanwhile, for a given formation porosity, a combination of a decrease in the formation density and a decrease in hydrogen index indicates a decrease in the pore fluid density and hydrogen content. For pores filled with water and gas or oil and gas, the density and hydrogen index are an indication of the gas saturation (volume fraction of the pores occupied by gas). For pores filled with gas only, the density and hydrogen index are an indication of gas density (pressure).

The density and neutron porosity tools for measuring formation density and hydrogen index may generally employ radioisotope sources to obtain formation density and hydrogen index measurements, respectively. For example, the density tool may use a source such as $^{137}Cs$ to emit gamma-rays into a formation. Based on a count of gamma-rays scattered by the formation, the density tool may determine the electron density of the formation. Similarly, the neutron porosity tool may use a source such as $^{241}AmBe$ to emit neutrons into a formation. A count of neutrons scattered by the formation may yield a hydrogen index measurement. Such radioisotope sources may be disadvantageous in oilfield tools, as the sources may be heavily regulated by law and they can be hazardous since they cannot be shut off.

In lieu of such radioisotope sources, an electronic neutron generator may be used which will produce neutrons which, in turn, produce gamma-rays. To do so, the electronic neutron generator may emit neutrons into a formation, which may in turn produce gamma-rays via inelastic scattering and neutron capture events. A count of gamma-rays produced by inelastic scattering may generally yield a signal that is related to formation density, and a count of scattered neutrons may generally yield a neutron porosity signal that corresponds to the hydrogen index of the formation. Alternatively, a count of capture gamma-rays may generally yield a neutron porosity signal that corresponds to the hydrogen index of the formation. If it is not possible to separate the inelastic and capture gamma-rays to produce nearly independent signals sensitive to formation density and hydrogen index, respectively, then the two signals may not be used together to enable a precise determination of porosity and gas saturation.

Neutron reactions that produce gamma-rays may be separated according to the energy of the neutron. After a 14 MeV neutron has been emitted by the source, it begins to lose energy by the processes of elastic and inelastic scattering. Inelastic scattering events are typically produced by neutrons in the energy range 1-14 MeV. After neutrons have decreased in energy below approximately 1 MeV, they typically have insufficient energy to inelastically scatter; however, they continue to lose energy by elastic scattering. The decrease in energy from 14 MeV to 1 MeV happens very rapidly, in a time typically less than 1 microsecond. Inelastic scattering reactions therefore occur very quickly after the neutron leaves the source, typically in less than 1 microsecond. From approximately 1 MeV down to thermal energy (approximately 0.025 eV), neutrons decrease in energy by elastic scattering over a time interval that ranges from 2 to several microseconds, depending on the amount of hydrogen in the formation. During that slowing time, neutrons may be captured and this may lead to the emission of one or more gamma-rays. These are so-called "epithermal" capture gamma-rays. Neutrons which decrease in energy completely to thermal energy continue to elastically scatter at that energy, often for many hundreds of microseconds until they are captured and this may lead to the emission of one or more gamma-rays. These are so-called "thermal" capture gamma-rays. Since neutrons are emitted from an electronic neutron source typically in bursts no shorter than 10 microseconds, it will be appreciated that the inelastic and epithermal capture gamma-rays are emitted substantially within that 10 microsecond burst and therefore overlap in time. Thermal capture gamma-rays, on the other hand, extend into the time interval between bursts as well as during the burst. Since there is overlap of capture and inelastic gamma-ray events during the burst, simply summing over all counts during the burst may yield a signal that corresponds, at least in part, to the hydrogen index of the formation, rather than to formation density. Various techniques to correct for the component of thermal neutron capture gamma-rays have been disclosed, for example, in U.S. Pat. No. 5,374,823 to Odom. Odom suggests that epithermal capture gamma-rays might be corrected if the epithermal neutron lifetime were known but gives no guidance on how to do this and suggests that it is unimportant anyway. Trcka, in U.S. Pat. No. 7,365,308 mentions the problem of epithermal capture gamma-rays but is silent on how to correct for them. In a similar way, Wilson in U.S. Pat. No. 6,207,953 discusses an "inelastic" gamma-ray count rate but this is just the burst sum corrected for thermal capture gamma-rays. No attempt is made to correct for the epithermal gamma-ray contamination. However, unless both thermal and epithermal capture gamma-rays are eliminated from the burst sum, the resulting signal will generally correspond in large part to hydrogen index rather than formation density, and is redundant with a capture gamma-ray or scattered neutron measurement of hydrogen index.

SUMMARY

Certain aspects commensurate in scope with the originally claimed embodiments are set forth below. It should be understood that these aspects are presented merely to provide the reader with a brief summary of certain forms the embodiments might take and that these aspects are not intended to limit their scope. Indeed, the embodiments may encompass a variety of aspects that may not be set forth below.

The present disclosure relates to systems, methods, and devices for inelastic gamma-ray logging. In one embodiment, such a method includes emitting neutrons into a subterranean formation from a downhole tool to produce inelastic gamma-rays, detecting a portion of the inelastic gamma-rays that scatter back to the downhole tool to obtain an inelastic gamma-ray signal, and determining a property of the subterranean formation based at least in part on the inelastic gamma-ray signal. The inelastic gamma-ray signal may be substantially free of epithermal and thermal neutron capture background.

BRIEF DESCRIPTION OF THE DRAWINGS

Advantages of the presently disclosed subject matter may become apparent upon reading the following detailed description and upon reference to the drawings in which.

DETAILED DESCRIPTION OF SPECIFIC EMBODIMENTS

One or more specific embodiments of the presently disclosed subject matter are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
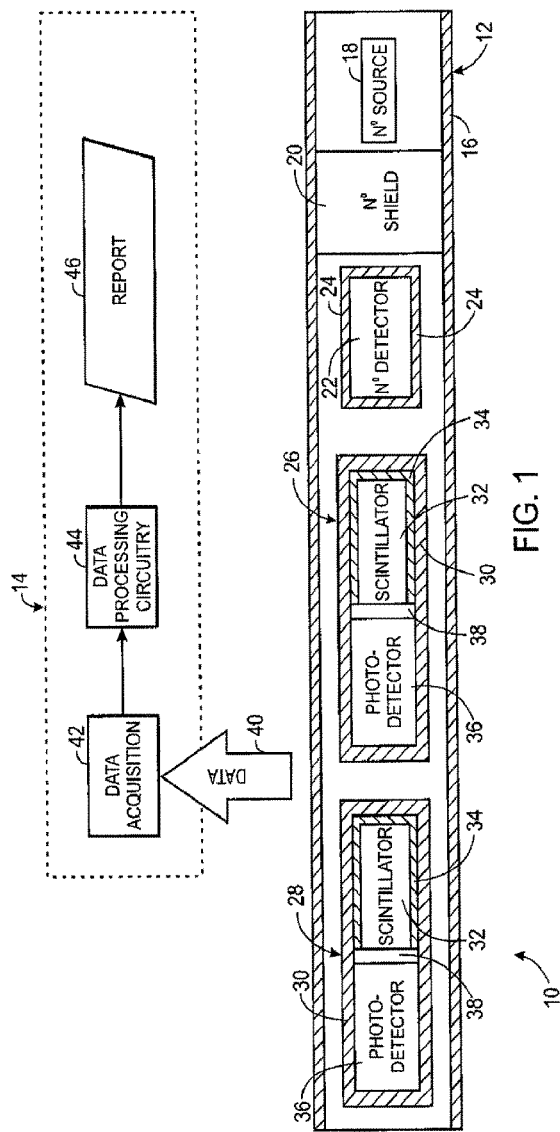
FIG. 1 illustrates a system for inelastic scattering well logging, in accordance with an embodiment.

Embodiments of the presently disclosed subject matter generally relate to systems and methods for well logging using gamma-rays produced by inelastic scattering events ("inelastic gamma-rays"). Counts or spectra of inelastic gamma-rays may indicate a variety of properties of a surrounding subterranean formation. For example, in combination with a hydrogen index signal, a count of inelastic gamma-rays may enable determination of porosity and gas saturation. FIG. 1 illustrates a system 10 for determining formation properties using inelastic gamma-rays that includes a downhole tool 12 and a data processing system 14. By way of example, the downhole tool 12 may be a slickline or wireline tool for logging an existing well, or may be installed in a borehole assembly for logging while drilling (LWD). The data processing system 14 may be incorporated into the downhole tool 12 or may be at a remote location.

Figure 2:
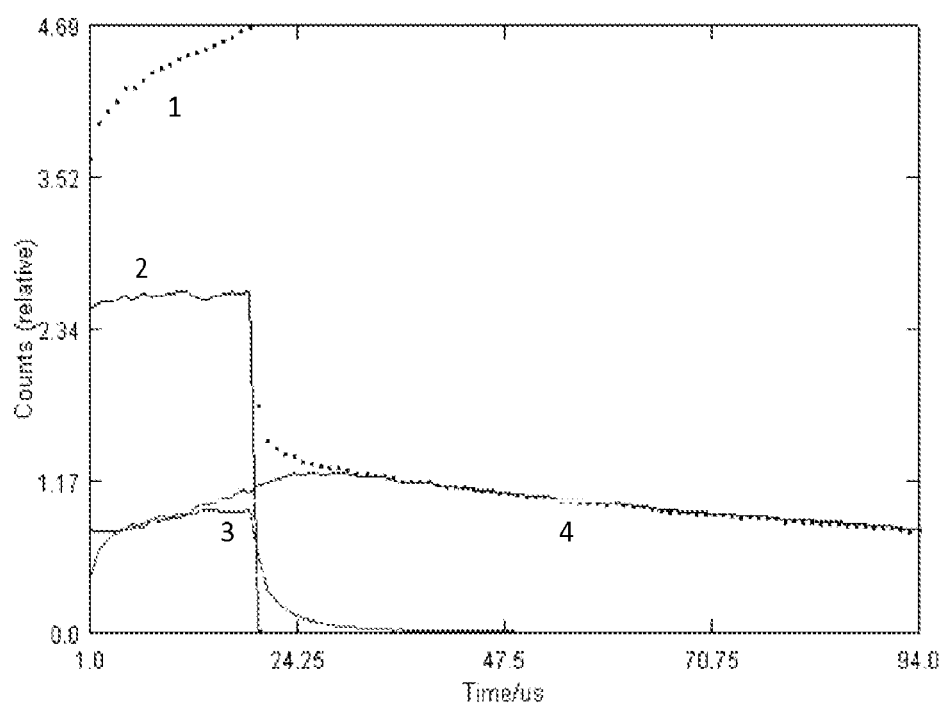
FIG. 2 illustrates the total gamma-ray detector counts as a function of time in accordance with an embodiment.

The downhole tool 12 may be constructed so as to improve detection of gamma-rays produced via inelastic scattering events, while reducing detection of gamma-rays produced via thermal and epithermal neutron capture events. Indeed, the downhole tool 12 may provide for a gamma-ray response substantially free of epithermal and thermal neutron capture background, such that the gamma-ray response is substantially independent of neutron porosity. With reference to FIG. 2, the total gamma-ray response 1 of an example downhole tool is decomposed by Monte Carlo modeling into the inelastic scattering 2, epithermal capture 3, and thermal capture 4 components. For the particular components in this tool, the sum of epithermal capture counts during the burst is approximately ⅓ of the sum of inelastic counts and is, therefore, quite large. While it might appear that one could estimate the epithermal capture amplitude and decay rate by sampling the count rate immediately after the burst and with that, correct for the epithermal component during the burst, this is difficult in practice because the epithermal capture count rate after the burst is much smaller than the thermal capture count rate. In effect, the thermal capture count rate during the burst-off period overwhelms the epithermal capture count rate, such that the epithermal count rate and decay rate cannot be determined independently. The fraction of the epithermal capture component relative to the inelastic scattering component varies depending on the materials used in the downhole tool The particular materials employed in each of the components may be described in greater detail below, with particular reference to FIG. 3. With continued reference to FIG. 1, the downhole tool 12 may be surrounded by a housing 16 made of elements with low resonance integrals such as cobalt-free steel. A neutron source 18 may be any suitable neutron source capable of emitting neutrons into a surrounding formation to produce inelastic gamma-rays. By way of example, the neutron source 18 may be a pulsed electronic neutron source, such as a Minitron™ by Schlumberger Technology Corporation. Additionally or alternatively, in certain embodiments, the neutron source 18 may be a radioisotope source capable of emitting fast neutrons. A neutron shield 20 containing elements with high (n,2n) cross sections, such as lead, bismuth or tungsten or combinations of these, may separate the neutron source 18 from various detectors in the downhole tool 12.

Certain embodiments of the downhole tool 12 may include a neutron detector 22, which may be surrounded by a cadmium-containing thermal neutron shield 24. The neutron detector 22, which may be a $^3$He neutron detector, may primarily detect epithermal neutrons rather than thermal neutrons, since the thermal neutron shield 24 may serve to prevent the passage of thermal neutrons to the detector 22. The downhole tool 12 may optionally include a neutron monitor 18.1, which is located near the Minitron and detects primarily unscattered neutrons directly from the neutron generator. The optional neutron monitor, which may be a plastic scintillator coupled to a photomultiplier, provides a count rate signal proportional to the neutron output rate from the generator. The downhole tool 12 may include one or more gamma-ray detectors, illustrated in FIG. 1 as a "near" gamma-ray detector 26 and a "far" gamma-ray detector 28, each of which may be surrounded by a housing 30. As should be appreciated, the near gamma-ray detector 26 and the far gamma-ray detector 28 are so named due to their relative proximity to the neutron source 18. In some embodiments, a scintillation crystal 32 of the near gamma-ray detector 26 may be located approximately 5" to 22" from the neutron source 18, while the scintillation crystal 32 of the far gamma-ray detector 28 may be located approximately 15" to 36" from the neutron source 18.

As noted above, the near gamma-ray detector 26 and the far gamma-ray detector 28 may be contained in respective housings 30. For reasons described below, each of the housings 30 may contain materials incorporating $^6$Li, such as lithium carbonate ($Li_2CO_3$), which may substantially shield the gamma-ray detectors 26 and 28 from thermal neutrons without producing thermal neutron capture gamma-rays. The scintillation crystals 32 of the gamma-ray detectors 26 and 28 may enable detection counts or spectra of gamma-rays by producing light when gamma-rays are scattered or absorbed by the scintillation crystals 32. For reasons described below, housings 34 of aluminum alloy or fiberglass may surround the scintillation crystals 32 to reduce production of epithermal neutron capture gamma-rays. Depending on the application, the scintillation crystals 32 may be chosen to include any of a variety of materials, as described below. Photodetectors 36 may detect light emitted by the scintillation crystals 32 when a gamma-ray is absorbed, once the light has passed through an optical window 38, to obtain a gamma-ray count.

The signals from the neutron detector 22, the near gamma-ray detector 26, and/or the far gamma-ray detector 28 may be transmitted to the data processing system 14 as data 40. The data processing system 14 may include a general-purpose computer, such as a personal computer, configured to run a variety of software, including software implementing all or part of the present technique. Alternatively, the data processing system 14 may include, among other things, a mainframe computer, a distributed computing system, or an application-specific computer or workstation configured to implement all or part of the present technique based on specialized software and/or hardware provided as part of the system. Further, the data processing system 14 may include either a single processor or a plurality of processors to facilitate implementation of the presently disclosed functionality.

In general, the data processing system 14 may include data processing circuitry 44, which may be a microcontroller or microprocessor, such as a central processing unit (CPU), which may execute various routines and processing functions. For example, the data processing circuitry 44 may execute various operating system instructions as well as software routines configured to effect certain processes and stored in or provided by a manufacture including a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the data processing circuitry 44 may process data provided as inputs for various routines or software programs, including the data 40.

Such data associated with the present techniques may be stored in, or provided by, the memory or mass storage device of the data processing system 14. Alternatively, such data may be provided to the data processing circuitry 44 of the data processing system 14 via one or more input devices. In one embodiment, data acquisition circuitry 42 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the data processing system 14 may exchange data and communicate with other networked electronic systems, whether proximate to or remote from the system. The network may include various components that facilitate communication, including switches, routers, servers or other computers, network adapters, communications cables, and so forth.

The downhole tool 12 may transmit the data 40 to the data acquisition circuitry 42 of the data processing system 14 via, for example, a telemetry system communication downlink or a communication cable. After receiving the data 40, the data acquisition circuitry 42 may transmit the data 40 to data processing circuitry 44. In accordance with one or more stored routines, the data processing circuitry 44 may process the data 40 to ascertain one or more properties of a subterranean formation surrounding the downhole tool 12. Such processing may involve, for example, one or more techniques for reducing an epithermal neutron capture background from a gamma-ray count, as described below. The data processing circuitry 44 may thereafter output a report 46 indicating the one or more ascertained properties of the formation, such as porosity and gas saturation, as discussed below. The report 46 may be stored in memory or may be provided to an operator via one or more output devices, such as an electronic display and/or a printer.

Figure 3:
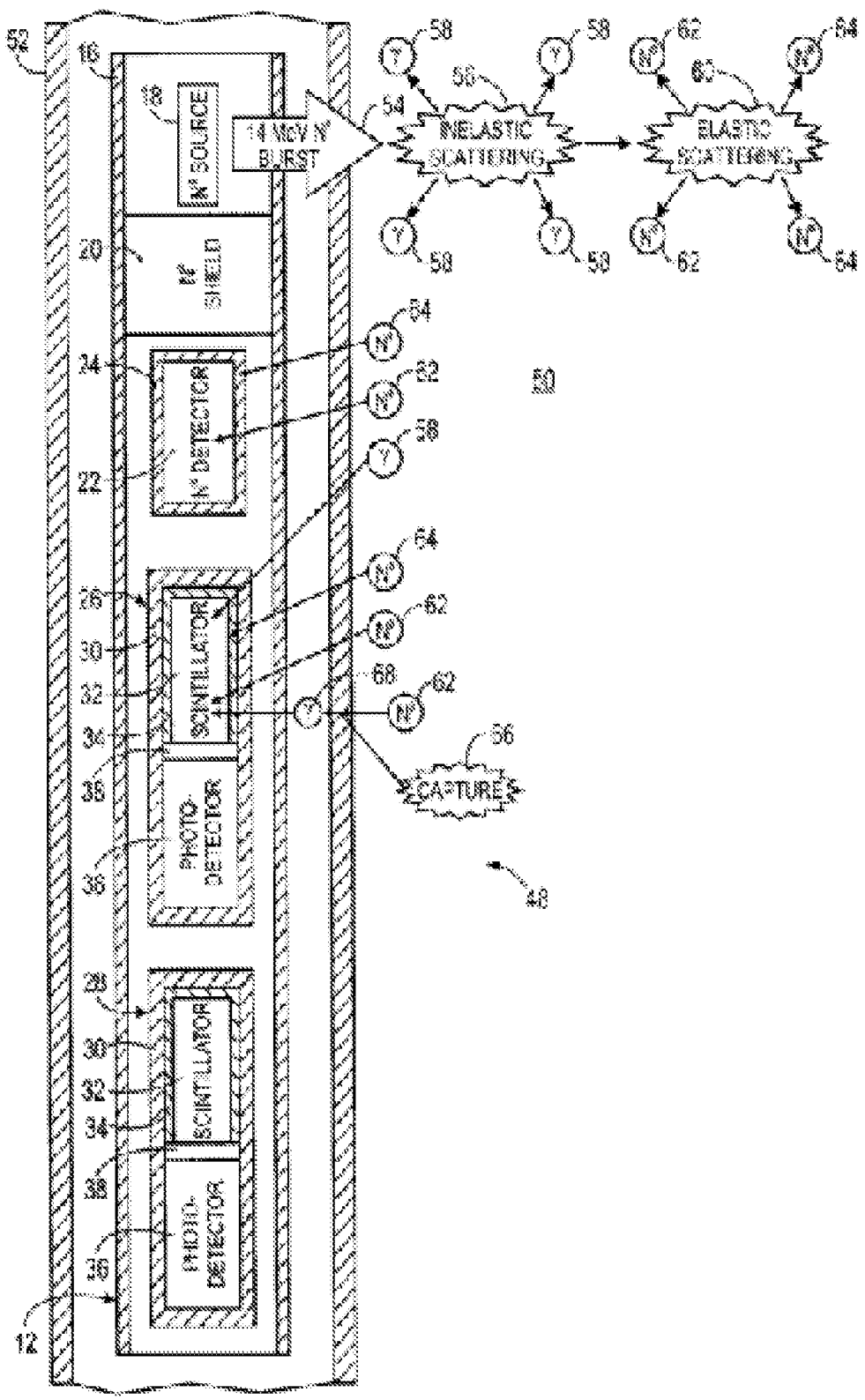
FIG. 3 illustrates a manner of operating the system of FIG. 1, in accordance with an embodiment.

FIG. 3 illustrates a well-logging operation 48 involving the downhole tool 12 in a surrounding subterranean formation 50. In the operation 48 depicted in FIG. 3, the downhole tool 12 has been lowered into an existing well surrounded by casing 52. The well-logging operation 48 may begin when the neutron source 18 outputs a burst of neutrons 54 of approximately 14.1 MeV or greater into the surrounding formation 50. Initially, the burst of neutrons 54 may collide with nuclei of the formation 50 in inelastic scattering events 56, which causes inelastic gamma-rays 58 to be emitted and the neutrons of the burst of neutrons 54 to lose energy. Following or concurrently with the inelastic scattering events 56, the neutrons of the burst of neutrons 54 may interact with the formation 50 in elastic scattering events 60, which causes the neutrons to drop in energy to eV and sub-eV levels as epithermal neutrons 62 and/or thermal neutrons 64.

The inelastic gamma-rays 58 produced by the inelastic scattering events 56 may subsequently Compton-scatter due to electrons in the formation 50. Some of the inelastic gamma-rays 58 may ultimately be detected in the near gamma-ray detector 26 or the far gamma-ray detector 28. The resulting count of the gamma-rays 58 may be sensitive to formation density for at least two reasons. First, the probability that one of the neutrons of the burst of neutrons 54 will interact with a nucleus of the formation 50 may be proportional to the number density of nuclei in the formation 50. Thus, if the formation 50 includes a greater number density of nuclei for the same chemical composition of the formation, the mean path between neutron collisions with nuclei becomes shorter. The neutrons lose energy through collisions faster and travel a shorter average distance from the neutron source before dropping below 1 MeV. Once the neutrons drop below approximately 1 MeV, the neutrons no longer have sufficient energy to create inelastic gamma-rays 58. Thus, a greater number density in the formation will decrease the number of inelastic gamma-rays produced far from the neutron source and fewer inelastic gamma-rays will be produced near the far detector 28. Since gamma-rays produced near the far detector 28 have a high likelihood of being detected, the far detector count rate is very sensitive to this neutron transport effect. Because the near detector 26 is closer to the neutron source, the decrease in the number of inelastic gamma-rays produced near the detector is much smaller than for the far detector 28. Second, the inelastic gamma-rays 58 created by the inelastic scattering events 56 may Compton-scatter more frequently if the formation 50 is more dense. As a result, the gamma-rays 58 may be less likely to reach the near gamma-ray detector 26 or the far gamma-ray detector 28 before being photoelectrically absorbed by the formation 50.

Either of the above-described effects may lead to a lower inelastic gamma-ray count as the density of the formation 50 increases. It should be noted, however, that the former effect is sensitive to the nucleus number density of the formation 50, while the latter effect is sensitive to the electron number density of the formation 50 or, approximately, the bulk density of the formation 50. The nucleus number density may not correlate well with bulk density because heavy nuclei and light nuclei often have similar neutron interaction probabilities; however, the combination of nuclei number density and bulk density obtained from a neutron-gamma measurement may be used in much the same way as a conventional density measurement based on Compton scattering of gamma-rays.

A complication may arise, however, due to the interaction of the neutrons of the neutron burst 54 with hydrogen in the formation 50. Because elastic scattering 60 occurs primarily due to interactions with hydrogen in the formation 50, the number of low-energy epithermal neutrons 62 and thermal neutrons 64 that reach the vicinity of the gamma-ray detectors 26 and 28 may accordingly be strongly influenced by the hydrogen index of the formation 50. If one of the epithermal neutrons 62 or thermal neutrons 64 were captured by a nucleus at or in the vicinity of the near gamma-ray detector 26 or the far gamma-ray detector 28, such as in the casing 52, a neutron capture event 66 may occur. Such a neutron capture event 66 may produce a neutron capture gamma-ray 68 that may be detected by the gamma-ray detector 26 or 28. Without correction, neutron capture gamma-rays 68 may completely overwhelm the inelastic gamma-rays 58, resulting in gamma-ray counts with the character of neutron porosity measurements, rather than density measurements. Such measurements would be of less use to combine with a neutron porosity (hydrogen index) measurement to identify gas because the two measurements would be highly correlated through hydrogen index.

For this reason, the downhole tool 12 may contain materials carefully chosen to reduce or eliminate neutron capture events 66 occurring in the downhole tool 12. Moreover, because some neutron capture events 66 may yet still occur in the downhole tool 12, and because some neutron capture events 66 may take place externally to the downhole tool 12, various techniques may be employed to reduce or eliminate any remaining neutron capture background from gamma-ray signals of the gamma-ray detectors 26 and/or 28. In particular, the materials chosen and the techniques employed may reduce or eliminate not only thermal neutron capture background, but also epithermal neutron capture background, from gamma-ray signals detected by the gamma-ray detectors 26 and/or 28. Additionally, certain materials in the downhole tool 12, such as the scintillation crystals 32, may be chosen based on additional criteria particular to a chosen well-logging application.

Considering first the material chosen for the scintillation crystals 32 in the gamma-ray detectors 26 and/or 28, the capture probability of epithermal neutrons in matter may be described approximately by a value known as "resonance integral," which is the integral cross section for interaction in the neutron resonance energy ("epithermal") region. The resonance integral for detector materials of interest are shown below in Table 1 (from "Nuclides and Isotopes Chart of the Nuclides," *Knolls Atomic Power Laboratory*, 16th Edition). The thermal capture cross section is indicated by the parameter $\sigma_a$. The materials described in Table 1 may generally form a component of a scintillation crystal.

TABLE 1

| Element | $\sigma_a$ (barns) | Resonance Integral (barns) | Relevant Material |
|---|---|---|---|
| Gd | 49000 | 400 | GSO |
| La | 9 | 12 | Lanthanum halide detectors |
| Si | 0.168 | 0.1 | GSO, Glass scintillators |
| O | 0.0 | 0.0 | GSO, Glass scintillators |
| Na | 0.53 | 32 | NaI detector |
| Cl | 33.5 | 12 | LaCl$_3$ detector |
| Br | 6.8 | 89 | LaBr$_3$ detector |
| I | 6.2 | 150 | NaI |
| Lu | 84 | 900 | Lu-based detectors |
| Y | 1.28 | 1 | Y-based detectors (e.g., YAlO$_3$) |
| Al | 0.23 | 0.17 | YAP detectors |
| Bi | 0.034 | 0.19 | BGO detectors |
| Ge | 2.2 | 6 | BGO detectors |
| Ce | 0.63 | 0.7 | Activator in LaCl$_3$, LaBr$_3$, GSO, YAP, LuAP |

From Table 1, it may be seen that certain materials all have components with a "resonance integral" of 89 or larger, such as GSO (gadolinium oxyorthosilicate, or Gd$_2$SiO$_5$); lutetium-based scintillators such as LuAP (LuAlO$_3$); LaBr$_3$; and NaI. On the other hand, certain other materials have no component with a resonance integral greater than 12, making them largely insensitive to epithermal neutron capture. Such materials include BGO (bismuth germanate, or Bi$_4$Ge$_3$O$_{12}$); LaCl$_3$; and YAP (YAlO$_3$).

The significance of the resonance integral and thermal capture cross section will be appreciated since neutron capture within the scintillation crystal generally results in the emission of a gamma-ray, which then has a high probability of being absorbed and detected by the scintillator. Depending on the particular nuclei in the scintillator and in the surrounding tool and formation, different energies of gamma-rays will be absorbed within the scintillator. In some applications where only high energy gamma-rays are desired, it is common to discriminate against lower energy gamma-rays with a pulse-height discriminator. However, in the application of gas detection and measurement, it is desirable to detect all inelastic gamma-rays entering the scintillator, regardless of energy, to optimize precision. It is, therefore, not desirable to reduce neutron capture gamma-rays by means of pulse height discrimination as this would also eliminate some inelastic gamma-rays. As a result, minimizing the resonance integral is meaningful.

In choosing the material for the scintillation crystals 32, other factors may be considered. Specifically, certain applications, such as Carbon/Oxygen (C/O) logging, may involve detection of inelastic gamma-rays 58 for use in spectroscopy analyses ("inelastic spectroscopy"). For such applications, the scintillation crystals 32 may be chosen to obtain an optimal precision (relative logging speed) for inelastic spectroscopy that may also optimize the response for the most statistically significant number of elemental yields. In an extensive study of scintillation crystals of various materials, the results of which are provided in Table 2 below, several factors pertinent to precision (relative logging speed) were considered according to the following relationship:

(Relative Logging Speed)~(Relative Spectral Quality)*(Relative Efficiency)*(Relative Maximum Counting Rate)*(Relative Improvement Due to Neutron Background Removal)     (1).

As considered in Equation (1) above, Relative Spectral Quality (higher value is better) represents a measure of the ability to separate, by a least-squares process, the spectral signatures of different elements in a statistical manner. Relative Spectral Quality includes many scintillation crystal properties, such as light output, atomic number, temperature response, peak-to-Compton ratio, size, and resolution. Relative Efficiency (higher value is better) represents a measure of the fraction of high-energy gamma-rays that interact while passing through the scintillation crystal and that are therefore detected. This value relates to scintillation crystal size, density, and atomic number. Relative Maximum Counting Rate (higher value is better) represents a measure of how fast the scintillation crystal is able to detect and process individual gamma-rays that are absorbed in the scintillator, and is based on the light production and decay properties of the scintillator. Relative Improvement due to Neutron Background Removal (higher value is better) is a measure of the statistical improvement in the measurement due to a change in the background neutron signal in the scintillation crystal. This number will increase with decreasing neutron background.

TABLE 2

| Detector | Relative Spectral Quality | Relative High-Energy Efficiency | Relative Improvement due to Neutron Bkg Removal | Relative Max Countrate | Relative Logging Speed (no neutron limit) | Relative Logging Speed (neutron limited) |
|---|---|---|---|---|---|---|
| LaCl | 1.63 | 0.32 | 3.01 | 11.5 | 12.5 | 1.7 |
| LaBr | 1.62 | 0.39 | 1.73 | 6.6 | 5.0 | 1.2 |
| NaI | 1.65 | 0.32 | 1.73 | 1.0 | 1.0 | 1.0 |
| GSO | 1.84 | 0.66 | 1.00 | 3.9 | 4.9 | 1.3 |
| BGO | 2.60 | 0.61 | 2.33 | 0.77 | 2.3 | 4.0 |
| LuAP | 1.39 | 0.65 | 1.03 | 13.6 | 12.1 | 1.0 |

Table 2 illustrates how these properties may vary for scintillation crystals of the same size of various types. The last two columns of Table 2 describe the relative logging speed (higher value is better) for the detector when all other factors are the same. Specifically, relative logging speed (no neutron limit) representing when measurements taken with a scintillation crystal are not neutron limited, meaning that enough neutrons are produced so as to push the scintillation crystal to its limit. Relative logging speed (neutron limited) provides a value representing when measurements taken with a scintillator are neutron limited, meaning that fewer neutrons are produced than a maximum capability of the scintillator. The numbers provided in Table 2 are based on a least-squares processing method, but it should be appreciated that the data may also be processed using a standard "windows" processing.

It should be appreciated that, in optimizing a tool containing one of the scintillation crystals listed above in Table 2, one would also adjust the position of the scintillation crystal relative to the neutron source, which may optimize the countrate of the scintillation crystal versus the degradation in formation response. Therefore, an optimum tool design may have an effective relative logging speed somewhere between the values in the two columns. It should also be noted that the spectral quality factor, neutron background term, and efficiency may change as the size of the scintillation crystal changes, which may also affect the values in the last two columns. As apparent in Table 2, spectral quality may not significantly impact the values of relative logging speed, but the three remaining factors may significantly impact the values of relative logging speed.

Based on the above considerations, the scintillation crystal 32 in the gamma-ray detectors 26 and/or 28 of the downhole tool 12 may include materials with a resonance integral less than 12, such as BGO (bismuth germanate, or $Bi_4Ge_3O_{12}$); $LaCl_3$; and YAP ($YAlO_3$). In particular, the scintillation crystals 32 may be formed of a lanthanum-halide scintillation crystal, such as LaCl, for inelastic gamma-ray spectroscopy applications, or of YAP ($YAlO_3$), for applications reliant on inelastic gamma-ray counts, such as porosity and gas saturation measurements. With such materials, epithermal neutrons 62 that pass through components of the downhole tool 12 to reach one of the scintillation crystals 32 may be less likely to cause neutron capture events 66 within the scintillation crystals 32. Accordingly, epithermal neutron capture gamma-ray background may be reduced.

Figure 4:
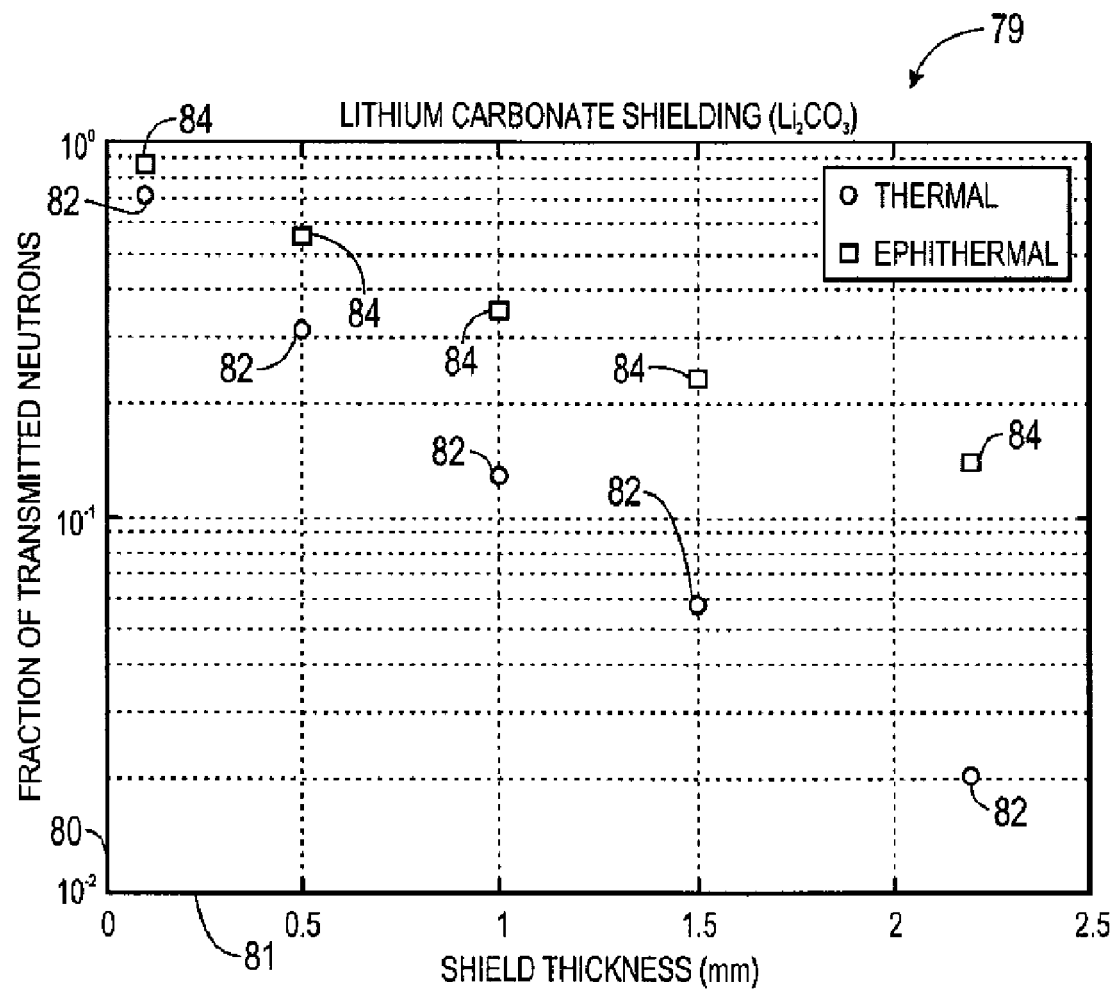
FIG. 4 is a plot illustrating thermal and epithermal neutron absorption capabilities of a lithium-containing shielding material, in accordance with an embodiment.

By choosing the scintillation crystal 32 such that the epithermal neutron capture background is low enough such that the epithermal component does not have to be removed by other means, an inelastic gamma-ray spectroscopy measurement may be improved due to various factors. First, if the epithermal capture background is not removed, the statistical variance (error) may not be inflated due to the process of subtracting the epithermal neutron capture background. Second, removal of unwanted counts may enable the designer of the downhole tool 12 to increase neutron output from the neutron source 18 or to change the spacing of the near and far gamma-ray detectors 26 and/or 28 such that the maximum count rate capability of each can be utilized for useful counts. Third, some potential complicated neutron physics may be removed from the petrophysical interpretation. The resulting better performance may be indicated by improved statistical precision and, hence, faster logging speed, by the ability to extract more statistically valid inelastic elements, and by the reduction of unwanted physics from the analysis. This improves not only the statistical precision but also the accuracy of the measurement. To reduce the effect of neutron capture in the gamma-ray detectors 26 and/or 28, the scintillation crystals 32 may be surrounded by thermal neutron shields 34. Specifically, to reduce thermal neutron capture gamma-ray production, the thermal neutron shields 34 may employ a material enriched with the isotope $^6$Li, which has a relatively high thermal neutron capture cross section, but which also produces primarily charged particles in lieu of gamma-rays as a consequence of the capture reaction $^6$Li(n,α)$^3$H. Candidate materials include lithium carbonate (Li$_2$CO$_3$) embedded in epoxy, or metallic lithium or Li$_3$N hermetically sealed in a metal can. As illustrated in FIG. 4, when the thermal neutron shields 34 include such a material, thermal neutrons 64 that reach the thermal neutron shields 34 may be absorbed without the production of neutron capture gamma-rays 68. Other Li compounds could be considered including Li$_3$PO$_4$, TetraLithium EDTA or less desirable LiF. An appropriate Li alloy may also be considered if it is formulated to reduce the natural chemical reactivity of the contained Li.

Turning briefly to FIG. 4, a plot 79 illustrates the neutron shielding capabilities of lithium carbonate (Li$_2$CO$_3$) enriched with the isotope $^6$Li. In the plot 79, an ordinate 80 represents a fraction of epithermal neutrons 62 and thermal neutrons 64 passing through a quantity of lithium carbonate (Li$_2$CO$_3$), displayed logarithmically from $10^{-2}$ to $10^0$. An abscissa 81 represents the thickness of the lithium carbonate (Li$_2$CO$_3$) in units of millimeters (mm). Data points 82 and 84 represent quantities of thermal neutrons 64 and epithermal neutrons 62, respectively, that pass through the lithium carbonate (Li$_2$CO$_3$). As shown in the plot 79, when the thickness of the lithium carbonate (Li$_2$CO$_3$) increases, the fraction of thermal neutrons 64 passing through the lithium carbonate (Li$_2$CO$_3$) drops dramatically. Accordingly, when the thermal neutron shields 34 include lithium carbonate (Li$_2$CO$_3$) enriched with the isotope $^6$Li, the quantity of thermal neutrons 64 that reach the scintillation crystals 32 may be substantially reduced.

An additional embodiment would be to add a third detector to the downhole tool of FIG. 1 for spectroscopy purposes, such that it would be placed between detectors 26 and 28. The scintillator of this detector could be chosen from materials of higher resonance integral as long as gamma-rays from capture of epithermal neutrons within the scintillator were not detected in significant amounts in detectors 26 and 28. To prevent such gamma-rays from being detected in detectors 26 and 28, shields made of lead, bismuth, tungsten or a combination of the three may be placed between the third detector and each of detectors 26 and 28.

Because epithermal neutrons 62 may also reach other components of the downhole tool 12, such as the housing 16 or the neutron shield 20, other components of the downhole tool 12 may be constructed of materials having a low resonance integral. The resonance integral for certain relevant materials are listed below in Table 3.

TABLE 3

| Element | $\sigma_a$ (barns) | Resonance Integral (barns) | Relevant Material |
|---------|---------|---------|---------|
| Fe | 2.56 | 1.4 | Steel |
| Ni | 4.5 | 2.2 | Steel |
| Cr | 3.1 | 1.6 | Steel |
| Co | 37.2 | 74 | Steel |
| Nb | 1.15 | 8.5 | Steel |
| Mo | 2.5 | 25 | Steel |
| Mn | 13.3 | 14 | Steel |
| V | 5 | 2.8 | Steel |
| Ti | 6.1 | 2.9 | titanium |
| Al | .23 | .17 | Aluminum alloy |
| Mg | .066 | .038 | Aluminum alloy |
| C | 0 | 0 | Fiberglass |
| O | 0 | 0 | Fiberglass |
| H | .332 | .149 | Fiberglass |
| Si | .168 | .1 | Fiberglass |
| W | 18.2 | 350 | Shield |
| Pb | .171 | .14 | Shield |
| Bi | .034 | .19 | Shield |

As shown in Table 3, the resonance integral of steels may be relatively low. However, the production of neutron capture gamma-rays 68 from neutron capture events 66 in steel can be high in large quantities of steel. Thus, where possible, the housing 16 and other various components of the downhole tool 12 should be made of aluminum alloy or fiberglass. To the extent that steel is used in components of the downhole tool 12, the steel should contain very little or no cobalt (Co), manganese (Mn), molybdenum (Mo) or niobium (Nb) to reduce the occurrence of epithermal neutron capture in the downhole tool 12. Thus, with reference to FIG. 3, the housing 16 of the downhole tool 12 may be constructed of steel without the previously mentioned elements, and the housings 30 of the gamma-ray detectors 26 and/or 28 may be constructed primarily of aluminum alloy or fiberglass. The thermal neutron shield 24 that may surround the neutron detector 22 may contain cadmium (Cd), and the neutron shield 20 between the neutron source 18 and the various other components of the downhole tool 12 may contain tungsten (W), lead (Pb),) or bismuth (Bi). Tungsten has desirable properties as both a gamma-ray shield and a neutron shield but it has a high resonance integral. To prevent gamma-rays from epithermal neutron capture in a tungsten shield from entering the detectors 26 and 28, a shield of lead (Pb) or bismuth (Bi) may be placed between the tungsten and detectors to shield the detectors from epithermal neutron capture gamma-rays from tungsten.

For some choices of scintillators 32, it may be desirable to include gamma-ray shielding between detectors 26 and 28. For example, if a LaCl$_3$ scintillator is chosen for detector 26 and a YAP detector is chosen for detector 28, some gamma-rays from neutron capture in the Cl of the LaCl$_3$ detector could be detected in the YAP scintillator. To prevent this, gamma-ray shielding composed of lead (Pb), bismuth (Bi), or tungsten (W) can be placed between the detectors. Additionally, if the neutron detector 24 has a thermal neutron filter that emits gamma-rays (such as cadmium (Cd) or Gadolinium (Gd)), a gamma-ray shield composed of Pb, Bi, or W can be placed between detectors 24 and 26 to prevent capture gamma-rays from the neutron filter from entering detector 26. To prevent gamma-rays from epithermal neutron capture in a tungsten shield from entering the detectors 26 and 28, a shield of lead (Pb) or bismuth (Bi) may be placed between the tungsten and detectors to shield the detectors from epithermal neutron capture gamma-rays from tungsten.

Figure 5:
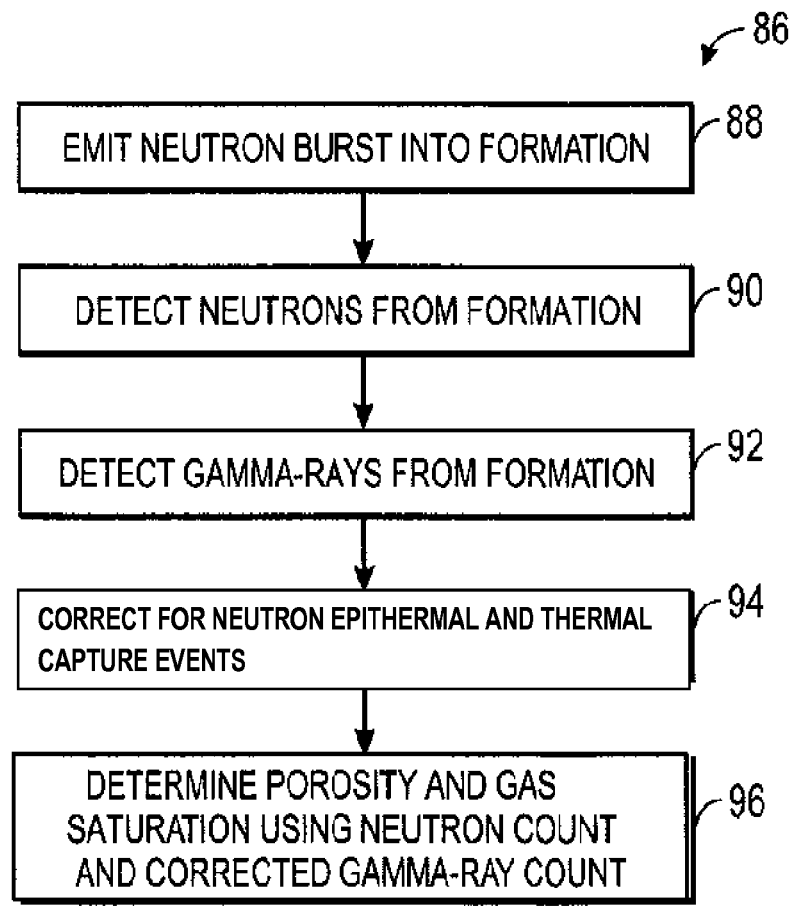
FIG. 5 is a flowchart describing an embodiment of a method for determining porosity and gas saturation using the system of FIG. 1, in accordance with an embodiment.

With the components of the downhole tool 12 optimized to reduce the number epithermal neutron capture events 66 in the downhole tool 12, the downhole tool 12 may be employed for a variety of applications. For example, FIG. 5 provides a flowchart 86 describing an embodiment of a method for logging porosity and gas saturation in a subterranean formation, such as the subterranean formation 50 of FIG. 3. In a first step 88, a burst of neutrons 54 of approximately 14.1 MeV may be emitted into the formation 50 via the neutron source 18. The emitted burst of neutrons 54 may interact with nuclei of the formation 50, resulting in inelastic scattering events 56 that produce inelastic gamma-rays 58. The burst of neutrons 54 may continue to lose energy through elastic scattering events 60, losing energy to become epithermal neutrons 62 and thermal neutrons 64.

In step 90, epithermal neutrons 62 that scatter back toward the downhole tool 12 may be detected using the neutron detector 22 surrounded by the thermal neutron shield 24 to obtain an epithermal neutron count. As noted above, the thermal neutron shield 24 may exclude substantially all thermal neutrons 64 from entering the neutron detector 22, resulting in a neutron signal that includes a count of substantially only epithermal neutrons 62. Alternatively, the epithermal neutron count may be obtained by detecting both epithermal neutrons 62 and thermal neutrons 64 using the neutron detector 22 without the thermal neutron shield 24 to obtain a total neutron count, before correcting the total neutron count to include only epithermal neutrons, as described below with reference to FIG. 8.

Figure 6:
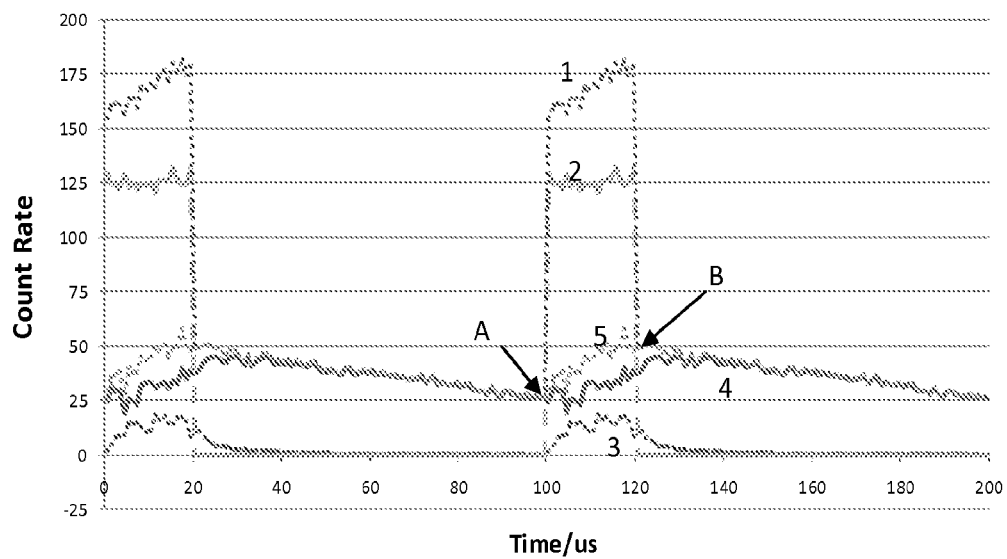
FIG. 6 illustrates the total gamma-ray detector counts as a function of time in an embodiment using materials with a low resonance integral.

In step 92, the near gamma-ray detector 26 and/or the far gamma-ray detector 28 may detect inelastic gamma-rays 58 from the formation 50, as well as neutron capture gamma-rays 68 that may still occur in or around the downhole tool 12, to obtain a raw gamma-ray count. Though the raw gamma-ray count may consist substantially of inelastic gamma-rays 58, a neutron capture background due to neutron capture gamma-rays 68 may contaminate the signal. FIG. 6 shows two burst periods of the total gamma-ray multichannel scalar count rate 1, inelastic gamma-ray count rate 2, the epithermal capture gamma-ray count rate 3, the thermal capture gamma-ray count rate 4, and the sum of epithermal and capture gamma-ray count rate (total capture gamma-ray count rate) 5 for a downhole pulsed-neutron tool when low-resonance-integral materials are chosen according to this invention. The epithermal capture gamma-ray background is greatly reduced compared to that in FIG. 1.1 of the prior art downhole tool. However, a small epithermal capture gamma-ray background and a significant thermal capture gamma-ray background remains. Thus, in step 94, the raw gamma-ray count may be corrected to reduce or eliminate the thermal and epithermal neutron capture background, such that the resulting gamma-ray count includes substantially only inelastic gamma-rays 58. The correction of step 94 may involve any of a variety of techniques, many of which are described below.

Figure 10:
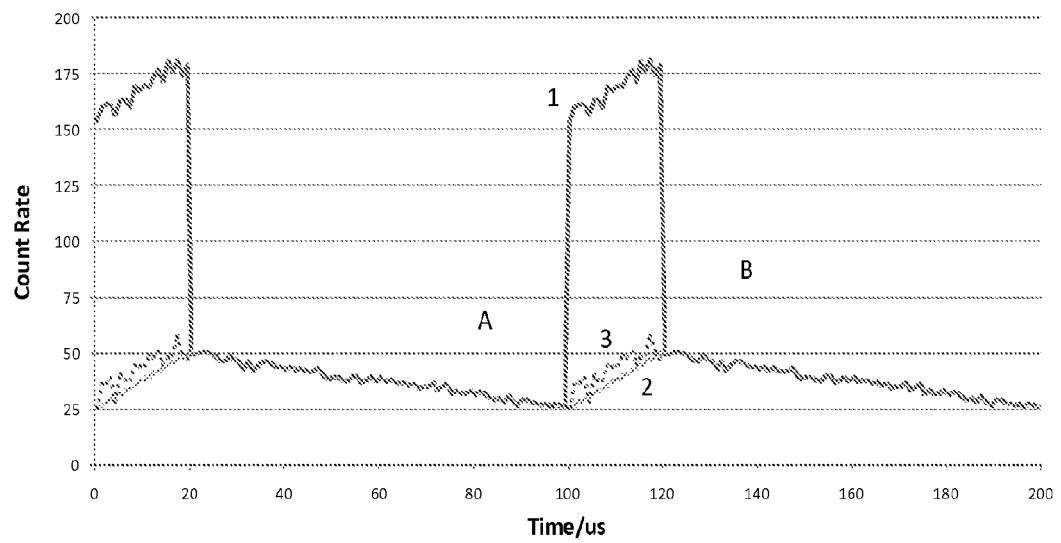
FIG. 10 illustrates the total gamma-ray detector counts as a function of time in an embodiment using materials with a low resonance integral and a method of subtracting capture background.

The total gamma-ray count rate illustrated in FIG. 6 has a sharp rise time at the beginning of a burst (A) and a sharp fall time at the end of the burst (B). Times A and B are straightforward to determine by various means; for example, from the sharp breaks in the count rate with time or by fitting regions B and C as defined in FIG. 7. Between points A and B, the thermal capture gamma-ray count rate 4 first decreases from its value at A and then increases as time approaches B. It continues to increase after the end of the burst for a short time as the neutrons emitted during the burst slow down to thermal energy. The epithermal count rate 3 has a complementary behavior. It first increases from its value at A (zero) and then becomes constant as time approaches B. Finally it decreases after the end of the burst for a short time as the last of the neutrons emitted during the burst decrease in energy to thermal. Because of the complementary nature of the epithermal 3 and thermal 4 capture gamma-rays during the burst, the sum of the two components 5 is almost linear between points A and B. Referring to FIG. 10, a simple linear connection 2 of the count rate at A to B is a close representation of the combined epithermal and thermal capture gamma-ray count rate 3. The sum of counts under the linear connection 2 is 14% lower than the sum of the total capture counts. Therefore, an accurate representation of the sum of the total capture gamma-ray counts is 1.14 times the sum of the linear connection counts. In practice the actual representation of the sum of the total capture gamma-ray counts is f times the sum of the linear connection counts, where f is a number may be different for each detector type and spacing from the source and is determined by calibration. Once the sum of the total capture gamma-ray counts is determined, it may be subtracted from the total gamma-ray counts during the burst to yield the sum of inelastic gamma-rays during the burst. An alternative to a linear background subtraction is to use a polynomial background subtraction where the additional terms in the polynomial are determine by requiring that the inelastic count rate after background subtraction is constant or nearly constant during the burst, or by Monte Carlo modeling.

It should be appreciated that the previous method is best applied in situations where the epithermal capture gamma-ray background is small compared to the inelastic gamma-ray component as a consequence of the low-resonance-integral nature of this invention. However, in the following several other capture gamma-ray subtraction methods are described as alternative embodiments that may be appropriate even if the epithermal capture background is not small compared to the inelastic gamma-ray component.

Having obtained a signal which may be a count of epithermal neutrons or may be a ratio of capture gamma-rays between the near 26 and far 28 detectors, which corresponds to neutron porosity and to hydrogen index, and a count of inelastic gamma-rays 58, which may correspond to a formation density measurement, the data processing circuitry 14 may determine porosity and gas saturation in step 96. One manner of determining porosity and gas saturation using the count of inelastic gamma-rays 58 is described below with particular reference to FIG. 13

Figure 7:
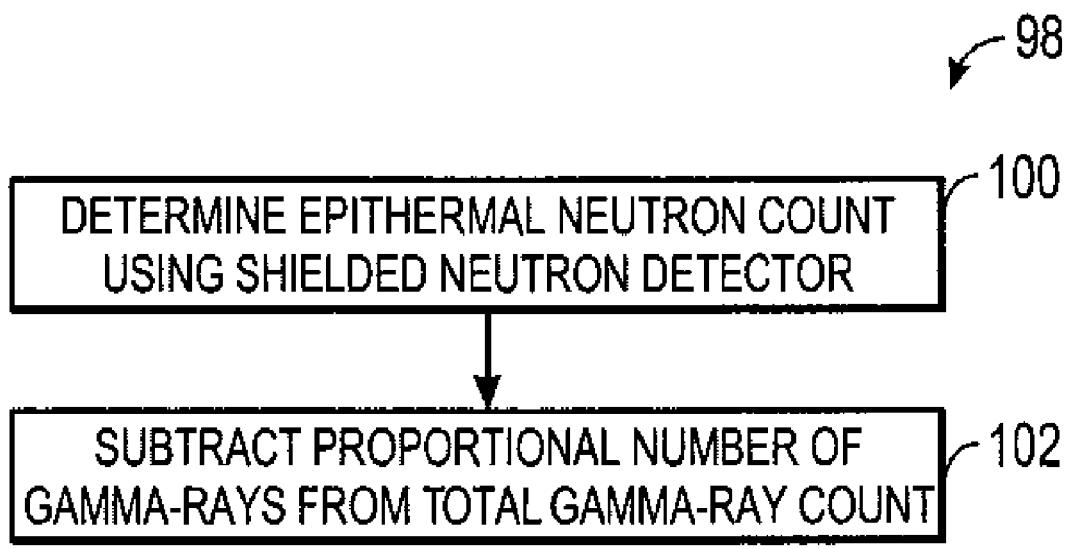
FIG. 7 is a flowchart describing an embodiment of a method for removing an epithermal neutron capture background from a gamma-ray count, in accordance with an embodiment.

FIG. 7 is a flowchart 98 representing an embodiment of a method for reducing or eliminating an epithermal neutron capture background from the raw gamma-ray count. The flowchart 98 may generally represent one manner of performing step 94 of the flowchart 86 of FIG. 7. In a first step 100, the data processing circuitry 44 of the data processing system 14 may receive a count of epithermal neutrons 62, which may be obtained from the neutron detector 22 surrounded by the thermal neutron shield 24. As described above, because the thermal neutron shield 24 largely prevents the detection of thermal neutrons 64, while permitting the detection of epithermal neutrons 62, the neutron count may include substantially only epithermal neutrons 62 without requiring further processing.

In step 100, the data processing circuitry 44 of the data processing system 14 may obtain a count of inelastic gamma-rays 58 by reducing the raw gamma-ray count by an amount proportional to the epithermal neutron count of step 98. Thus, the corrected gamma-ray count may include substantially only inelastic gamma-rays 58, and may therefore be independent of the neutron porosity measurement.

Figure 8:
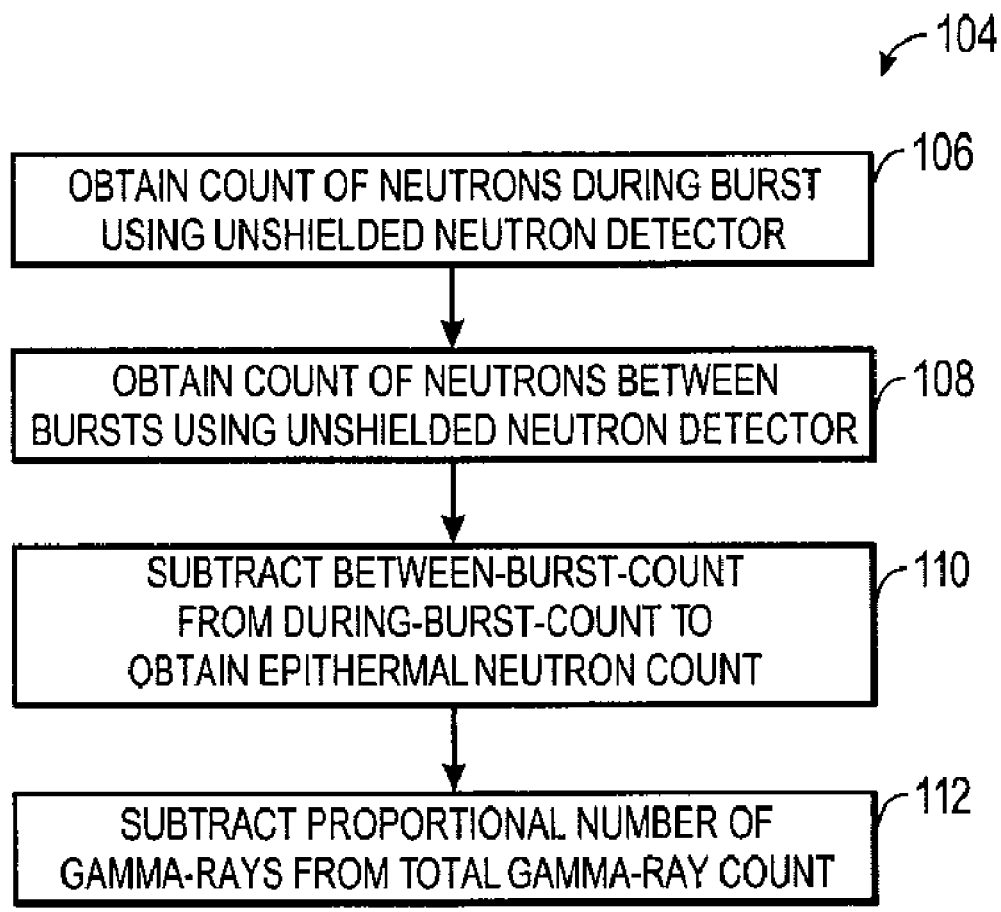
FIG. 8 is a flowchart describing another embodiment of a method for removing an epithermal neutron capture background from a gamma-ray count, in accordance with an embodiment.

FIG. 8 is a flowchart 104 representing an embodiment of an alternative method for reducing or eliminating an epithermal neutron capture background from the raw gamma-ray count. The flowchart 104 may also generally represent one manner of performing step 94 of the flowchart 86 of FIG. 7. In a first step 106, the data processing circuitry 44 of the data processing system 14 may receive a count of both epithermal neutrons 62 and thermal neutrons 64, which may be obtained from a neutron detector 22 that lacks a thermal neutron shield 24. The neutron count ascertained in step 106 may represent all neutrons detected at a time when the neutron source 18 is emitting the neutron burst 54. During this time, the short-lived epithermal neutrons 62 may be present alongside the longer-lived thermal neutrons 64.

In step 108, the data processing circuitry 44 may receive a count of thermal neutrons, which may represent all neutrons detected by the unshielded neutron detector 22 between emissions of the neutron burst 54. Because the thermal neutrons 64 are longer-lived than the epithermal neutrons 62, substantially all of the neutrons detected after the neutron burst 54 may be thermal neutrons. Thus, the neutron count received in step 108 may accordingly include substantially only thermal neutrons 64.

In step 110, the data processing circuitry 44 may determine an approximate epithermal neutron count by reducing the neutron count of step 106 by the normalized neutron count of step 108. In step 112, the data processing circuitry 44 may determine a count of inelastic gamma-rays 58 by reducing the raw gamma-ray count by an amount proportional to the approximate epithermal neutron count of step 110. The corrected gamma-ray count may therefore include substantially only inelastic gamma-rays 58.

Figure 9:
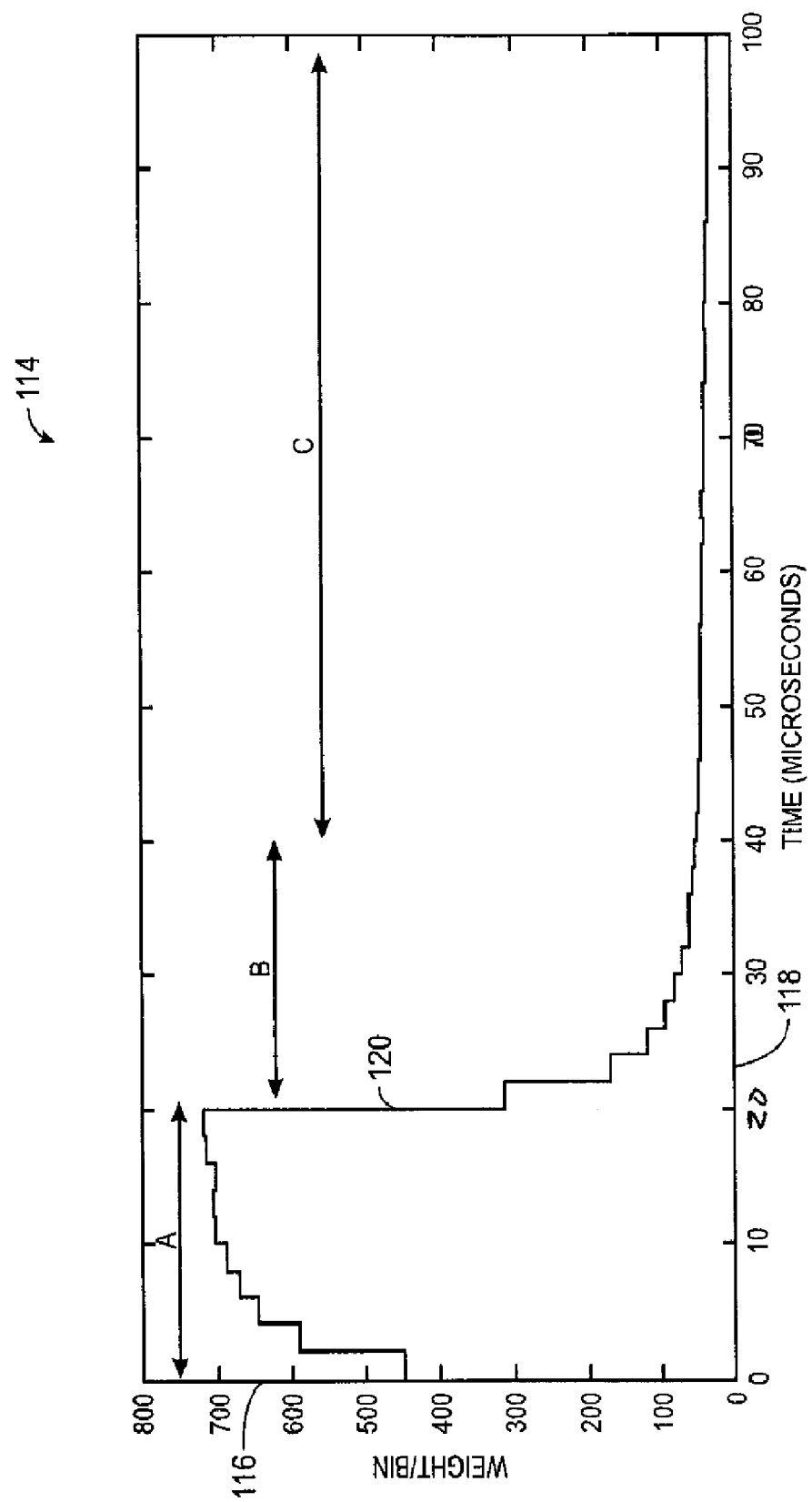
FIG. 9 is a plot illustrating an exemplary count of gamma-rays detected during and immediately following a neutron burst using the system of FIG. 1, in accordance with an embodiment.

Alternative methods of performing the correction of step 94 of FIG. 5 may not involve a count of epithermal neutrons 62, as described above with reference to FIGS. 5 and 6, but may rather rely upon the temporal nature of the gamma-ray response during and following the burst of neutrons 54. Turning to FIG. 9, a plot 114 illustrates a simulated gamma-ray count from a single gamma-ray detector, such as the near gamma-ray detector 26, during and after the burst of neutrons 54. An ordinate 116 represents the total count weight of the detected gamma-rays and an abscissa 118 represents time in units of microseconds (p). A curve 120 represents the total count of gamma-rays at various points in time.

A first time segment between 0 and 20 microseconds, labeled A, represents a time when the neutron burst 54 is being emitted from the neutron source 18. A second time segment from 20 microseconds to 40 microseconds, labeled B, represents a time following the neutron burst 54. In the time segment B, nearly all inelastic scattering events 56 have ended, and the detected gamma-rays are due substantially entirely to capture events 66 involving epithermal neutrons 62 and thermal neutrons 64. A third time segment between 40 microseconds and 100 microseconds, labeled C, represents a time when substantially all gamma-rays detected are due to capture events 66 involving thermal neutrons 64. Based on data represented by the curve 120, the data processing circuitry 44 of the data processing system 14 may reduce or eliminate epithermal neutron capture background from a raw gamma-ray count obtained by the near gamma-ray detector 26 and/or the far gamma-ray detector 28. Such techniques may be described with reference to FIGS. 11 and 12.

Figure 11:
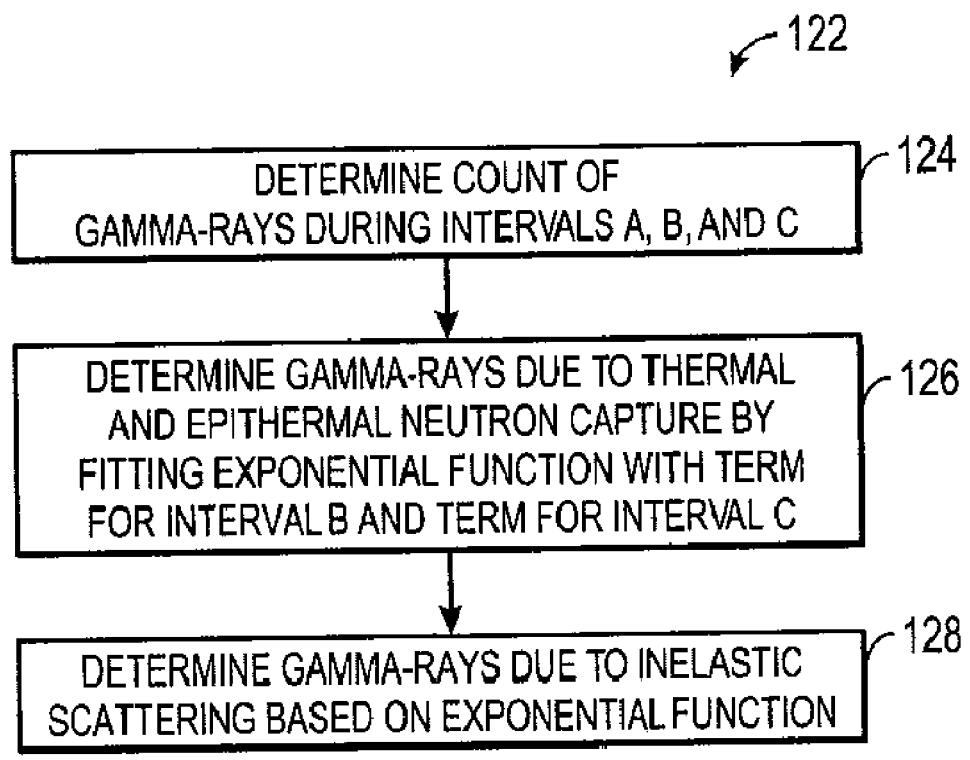
FIG. 11 is a flowchart describing another embodiment of a method for reducing an epithermal neutron capture background from a gamma-ray count, in accordance with an embodiment.

Turning to FIG. 11, a flowchart 122 represents another embodiment of a method for correcting for, reducing, or eliminating an epithermal neutron capture background from a raw gamma-ray count. The flowchart 122 may generally represent one manner of performing step 94 of the flowchart 86 of FIG. 5. In a first step 124, the data processing circuitry 44 of the data processing system 14 may receive a count of gamma-rays detected for time segments A, B, and C. Such a gamma-ray count may represent both inelastic gamma-rays 58 as well as epithermal and thermal neutron capture gamma-rays 68.

In step 126, the data processing circuitry 44 may fit an exponential function to the curve 120 in the intervals B and C. The exponential function may include a term for thermal neutron capture, fitted in the interval C, and an additional term for epithermal neutron capture, fitted in the interval B. In this way, terms proportional to the epithermal count rate and thermal count rate may be determined separately. In step 128, the data processing circuitry 44 may apply the exponential function to the interval A. The exponential function may be used for subtracting appropriate fractions of the epithermal count rate and the thermal count rate from the gross count rate in the interval A, leaving a corrected count of substantially only inelastic gamma-rays 58.

In lieu of, or in addition to, fitting an exponential function to the curve 120 to ascertain thermal and epithermal neutron capture background, the data processing circuitry 44 may employ inverse Laplace transforms to ascertain the same. Such techniques are described in greater detail with regard to compensation for thermal neutron capture background in U.S. application Ser. No. 11/768,034, "Well Logging Method For Determining Formation Characteristics Using Pulsed Neutron Capture Measurements," which is incorporated by reference herein in its entirety. The techniques may be extended to compensate for epithermal neutron capture background by considering, as described by the flowchart 122 of FIG. 11, that the interval B immediately following the neutron burst 54 includes both epithermal and thermal neutron capture background, while the subsequent interval C includes substantially only thermal neutron capture background.

Figure 12:
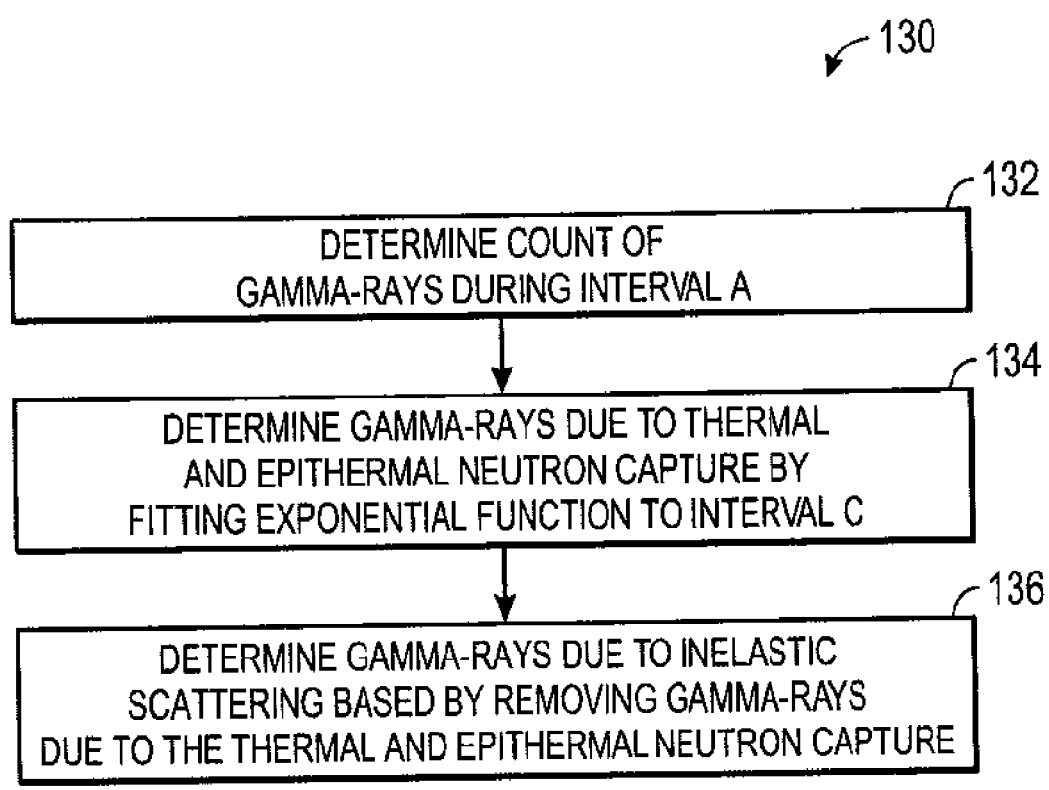
FIG. 12 is a flowchart describing another embodiment of a method for reducing an epithermal neutron capture background from a gamma-ray count, in accordance with an embodiment.

FIG. 12 is a flowchart 130 representing another embodiment of a method for reducing or eliminating an epithermal neutron capture background from a raw gamma-ray count. The flowchart 130 may generally represent one manner of performing step 94 of the flowchart 86 of FIG. 5 In the flowchart 130, epithermal neutron capture background is corrected based on the increase in gamma-ray count that occurs during the interval A.

In a first step 132, the data processing circuitry 44 may receive a count of the gamma-rays detected during the interval A, which represents the time interval during which the neutron burst 54 is emitted. In step 134, the data processing circuitry 44 may determine the quantity of epithermal and thermal neutron capture gamma-rays 68 by analyzing the increase in raw gamma-ray count over the interval A. It should be appreciated that if the neutron output during the burst 54 is not constant as a function of time, a correction can be made using an instantaneous count rate from a fast neutron monitor that may be placed near the neutron source 18. Turning briefly to FIG. 9, the curve 120 indicates a sharp rise at the beginning of the interval A, indicating that the increase in gamma-rays detected during the neutron burst 54 may be dominated by epithermal neutron capture gamma-rays 68. If the neutron burst 54 is short enough, and the separation between neutron bursts 54 is significantly longer than a characteristic time $\tau$, the count rate during the interval A can represented by a single exponential buildup. For example, the following relationship may represent the exponential buildup of epithermal neutron capture events:

$$I_{tot} = I_{inel} + I_{capture} \cdot \left(1 - e^{-\frac{t}{\tau}}\right), \quad (2)$$

where τ represents a characteristic time related to the epithermal slowing-down time, and τ is the time from the beginning of the burst 54. Based on the relationship determined in step 134, the data processing circuitry 44 may determine a count of inelastic gamma-rays 58 in step 136. In one embodiment, the data processing circuitry 44 may subtract appropriate fractions of the epithermal count rate and the thermal count rate from the gross count rate in the interval A, leaving a corrected count of substantially only inelastic gamma-rays 58.

Another embodiment of a method for reducing or eliminating an epithermal neutron capture background from a raw gamma-ray count is the following. From a fit to regions B and C of FIG. 8 using exponential or other fitting functions, the background count rate immediately prior to the burst and immediate after the burst may be determined. A linear background defined from these two points can be used to estimate the background underlying the inelastic gamma-ray peak. If the epithermal capture component is small, then this estimate will be approximate to the total capture gamma-ray background. However, if the epithermal capture component is larger, then this estimate will more closely approximate the thermal capture component. However, the epithermal capture component is related to the total capture gamma-ray count rate over the entire cycle, including burst-on and burst-off periods.

Each of the above-described manners of correcting for neutron capture events may benefit from further techniques for epithermal neutron capture background reduction. As shown in the curve 120 of FIG. 9 at the interval A, a gross count rate of gamma-rays increases by almost a factor of two from the start of the interval to its finish. This buildup is due largely to a buildup of epithermal neutron capture gamma-rays 68. If the neutron burst 54 were much shorter, the buildup of epithermal neutron capture gamma-rays 68 would be reduced. As such, a greater fraction of the gross count of gamma-rays would be due to inelastic gamma-rays 58. In an alternate embodiment, the epithermal capture background could be reduced if the neutron burst (interval A in FIG. 7) was sufficiently short that the most of the fast neutrons had not had sufficient time to slow to epithermal and thermal energies and the gamma ray signal would be predominantly comprised of inelastic gamma rays. The burst would be repeated after allowing sufficient time most of the epithermal neutrons to decay. The remaining thermal neutron capture background could then be accurately corrected with conventional methods.

While maintaining approximately the same duty cycle, or fraction of on-time to off-time, the pulse width of the neutron burst 54 may be reduced. In this way, the epithermal neutron capture gamma-ray background that occurs during the neutron burst 54 may be minimized. By way of example, the interval A may be reduced to approximately 4 microseconds, the interval B be reduced to approximately 4 to 8 microseconds, and the period C may be reduced to approximately 8 to 20 microseconds. Other combinations of time intervals are possible for reducing the epithermal neutron capture background with a reduced pulse width. As such, the combination of time intervals should not be limited to the examples stated above.

Figure 13:
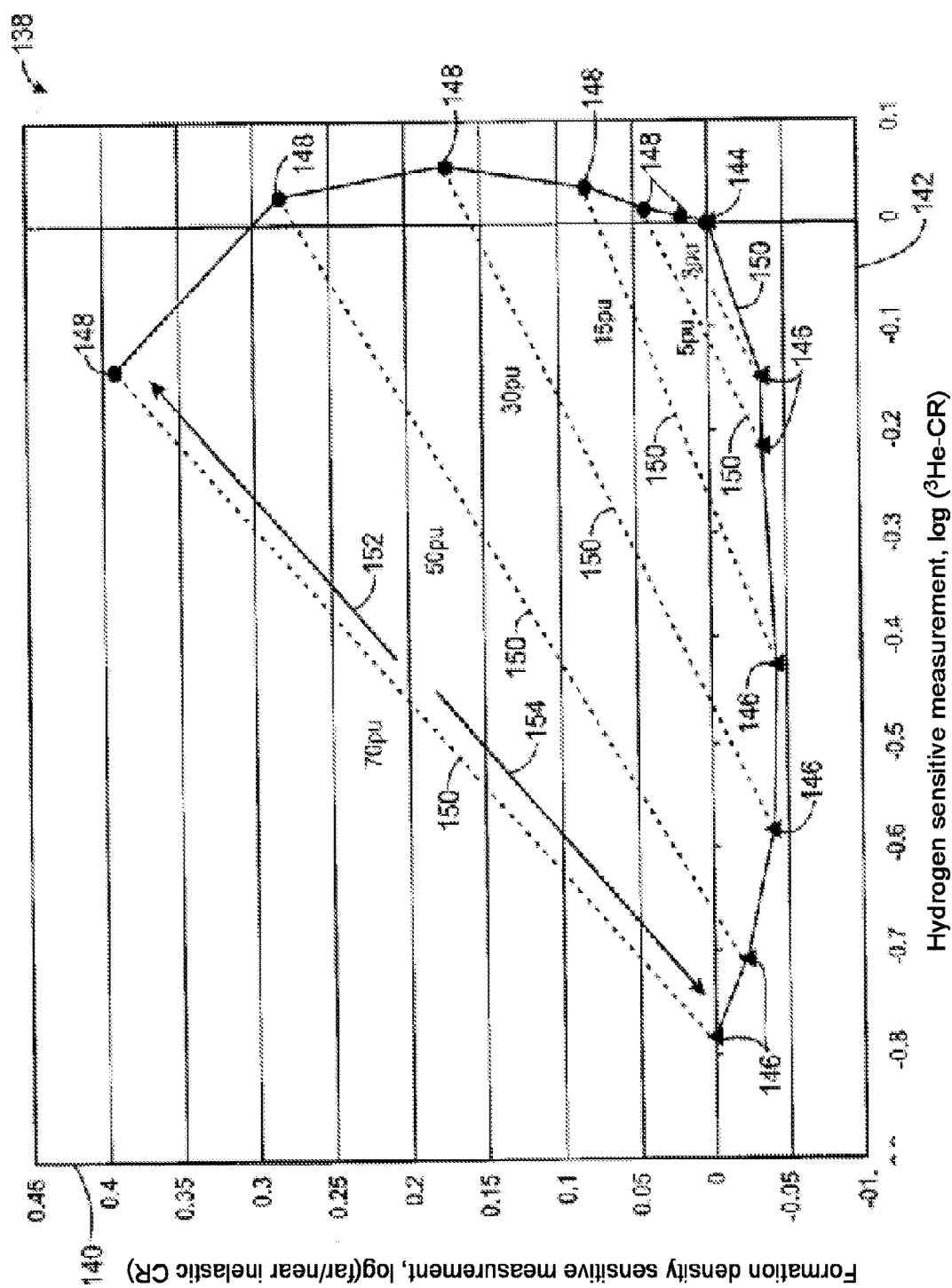
FIG. 13 is a plot simulating the determination of porosity and gas saturation of a formation using the system of FIG. 1, in accordance with an embodiment.

FIG. 13 depicts a plot 138 illustrating how data 40 obtained from the downhole tool 12 may be used for determining gas saturation and porosity in the formation 50. The plot 138 may represent a manner of performing the step 96 of the flowchart 86 of FIG. 5. In the plot 138, an ordinate 140 represents a logarithm of a ratio of inelastic gamma-ray counts from the far gamma-ray detector 28 to inelastic gamma-ray counts of the near gamma-ray detector 26, represented as log(far/near). Such a ratio of inelastic gamma-ray counts, free from epithermal and capture gamma-ray contamination, may be representative of the density of the formation 50. A ratio of detector counts is used because certain unknown factors such as the output of the neutron generator cancel out. Alternatively, if the output of the neutron generator is sufficiently stable or is otherwise normalized, an inelastic gamma-ray count from a single one of the gamma-ray detectors 26 or 28 may be used. In either case, the gamma-ray count may substantially include only inelastic gamma-rays 58 as any of the corrective techniques described above may have previously reduced or eliminated epithermal neutron capture background. An abscissa 142 represents a logarithm of a neutron count from the neutron detector 22, represented as log($^3$He). While simulated neutron counts from the neutron detector 22, log($^3$He), are employed in the instant example, any signal that is sensitive to hydrogen index could also be used. Examples of signals sensitive to hydrogen index include ratios of neutron counts from near and far-spaced neutron detectors, ratios of thermal neutron capture gamma-rays from near- and far-spaced gamma-ray detector, or sigma. It should be appreciated that that this method of plotting a ratio of epithermal-background-free inelastic gamma-rays vs. a hydrogen index signal is different from the prior art plot of Wilson in U.S. Pat. No. 6,207,953, in which an MeV fast neutron signal is plotted vs. a gamma-ray ratio. In the prior art plot, the fast neutron signal is not very sensitive to hydrogen index, because hydrogen has a relatively small influence on transport of MeV neutrons. The fast neutron signal is primarily sensitive to scattering from the rock matrix atoms, as is disclosed by Stephenson in U.S. Pat. No. 5,532,482. Additionally, the gamma-ray ratio of the prior art plot contains both inelastic gamma-rays and epithermal capture gamma-rays even though the thermal capture gamma-ray component has been removed. As a result, the prior art gamma-ray ratio is sensitive to both the rock matrix and hydrogen in the fluids and is not independent of the fast neutron signal.

The count rate of epithermal neutrons 62 or thermal neutrons 64 detected by the neutron detector 22, or log($^3$He), may decrease as the hydrogen concentration, or hydrogen index, in the formation 50 increases. As noted above, the hydrogen index will decrease if either the liquid-filled porosity ("Φ") of the formation 50 decreases or if the pore fluid density of the formation 50 decreases, as may occur with replacement of water by gas (gas saturation, or "$S_g$"). Thus, a combination of measurements primarily sensitive to hydrogen index alone cannot distinguish between these two effects. It should be noted that measurements that purport to measure quantities that are independent of hydrogen index, such as "a far/near inelastic ratio" of raw GR counts from the burst-on (A) timing gate (IRAT), may often be so contaminated by neutron capture events that they have essentially the same character as a hydrogen index measurement.

To separate porosity ("Φ") and gas saturation ("$S_g$"), a second measurement that is truly independent of hydrogen index may be employed. In open-hole, a bulk density measurement may be used, which may be replaced by the log(far/near) measurement plotted in FIG. 13 Bulk density may correspond primarily to the density of atoms in the rock matrix of the formation 50, which may be complementary to a hydrogen index measurement. Accordingly, bulk density (log(far/near)) and neutron porosity (log($^3$He)) may be crossplot to determine true porosity $\Phi$ and gas saturation $S_g$.

To determine porosity $\Phi$ and gas saturation $S_g$ using the plot 138 of FIG. 13, the (log(far/near) corrected inelastic GR count is plotted versus the log($^3$He) count. The ratios are normalized to the value at zero porosity units (p.u.), such that when the logarithm of the ratio is taken, the 0 pu value is at zero, representing a unity point 144 in the plot 138. Data points 146 are plotted for water-filled pores, which contain no gas, at varying porosities $\Phi$. Similarly, data points 148 are plotted for empty pores at the varying porosities $\Phi$. Dashed lines 150 represent increasing 152 or decreasing 154 values of gas saturation $S_g$ between water-filled pore data points 146 and empty pore data points 148 at the listed porosities $\Phi$. At any point along a given dashed line 150, gas saturation $S_g$ decreases approximately linearly from 1.0 at the corresponding empty pore data point 148 to 0.0 at the corresponding water-filled data point 146. At any point along the dashed line 150, both the porosity $\Phi$ and gas saturation $S_g$ may be uniquely defined.

As should be clear, any point within the boundary defined by the water-filled pore data points 146 and empty-pore data points 148 represents a unique combination of porosity $\Phi$ and gas saturation $S_g$ values. The transform between points in log(ratio) and log($^3$He) space to porosity $\Phi$ and gas saturation $S_g$ space can be calibrated using formations of known porosity $\Phi$ and gas saturations $S_g$ or can be calculated using a Monte Carlo technique. The transform can include smoothly varying functions to connect two spaces or can simply implement a lookup table that interpolates between calibration data. In either case, the above-described technique may represent a manner of directly extracting porosity $\Phi$ and gas saturation $S_g$ from the raw data obtained by the downhole tool 12.

With reference to FIGS. 4-13, the downhole tool 12 may be employed in determining porosity $\Phi$ and gas saturation $S_g$ by obtaining counts of inelastic gamma-rays 58. Certain other applications, such as carbon/oxygen (C/O) logging or the measurement of other elements in the formation 50, may involve gamma-ray spectroscopy involving the inelastic gamma-rays 58. For such gamma-ray spectroscopy techniques, the gamma-ray detectors 26 and/or 28 may include scintillation crystals 32 of lanthanum-halide, such as LaCl. FIG. 5 86 describes a method to determine porosity and gas saturation for a given set of environmental conditions.

Figure 14:
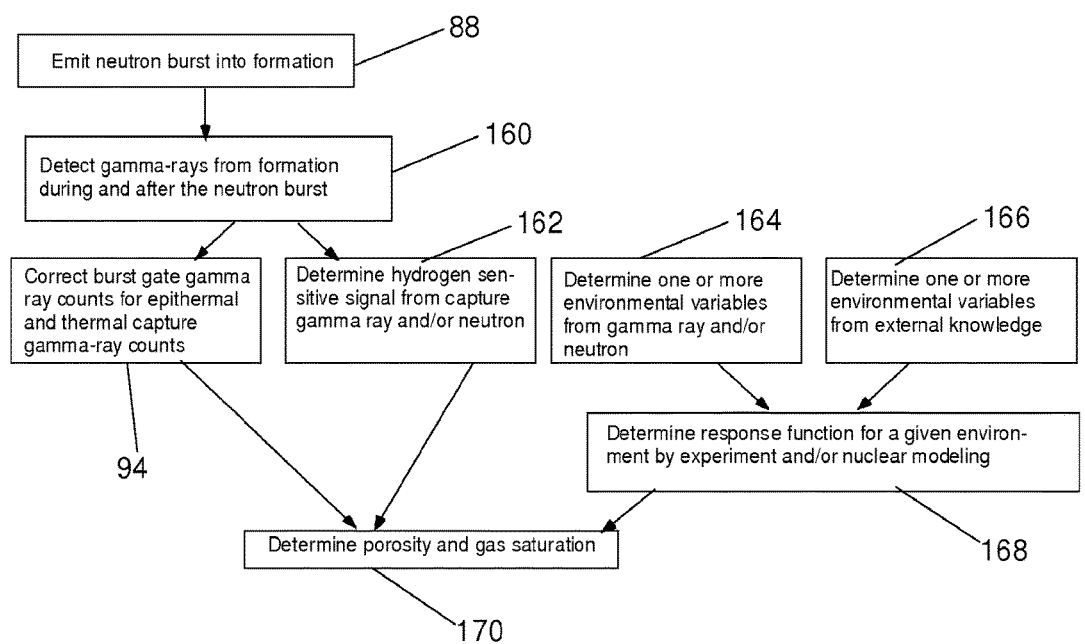
FIG. 14 is a flowchart with an alternate approach for determining porosity and gas saturation without using a signal from a neutron detector.

FIG. 14 illustrates a workflow of an alternate embodiment that accounts for various environmental effects that can affect the measurement of a formation density sensitive measurement, such as epithermal and thermal capture corrected far/near inelastic GR counts, and the hydrogen sensitive measurement, such as log($^3$He) counts or far/near capture GR counts. FIG. 14 is similar to the flowchart 86 of FIG. 5, but adds additional steps that account for varying environmental effects including, but not limited to; borehole size, casing diameter, casing material, casing thickness, casing position in the borehole, cement composition, borehole fluid properties, formation fluid properties, formation gas properties, borehole water salinity, formation water salinity and formation lithology. All of these environmental variables can affect the measurements 94 and 162. However, these environmental variables can be determined either through another measurement 164 of some aspect of the measured gamma-ray and/or neutron from which the environmental variable can be determined or by assuming a certain environment using external knowledge 166. Once all the environmental variables are determined, a proper response function 168 for a given environment can be used, which would be similar, but not necessarily the same as FIG. 13 and the porosity and gas saturation can be determined 170.

Some possible pulsed neutron measurements that are described in prior art that could be used to determine some of the environmental variables 162 are (but not limited to): gamma-ray and/or neutron decay rate can be used to determine borehole salinity, formation salinity and/or shale volume; inelastic gamma ray spectroscopy can be used to determine borehole fluid composition, formation fluid composition and/or lithology in certain conditions; capture gamma-ray spectroscopy can be used to determine lithology.

Some possible external measurements 166 that are described in prior art that could be used to determine some of the environmental variables are (but are not limited to): cement bond logs to determine cement composition; production logs to determine borehole fluid properties; pipe integrity logs such as ultrasonic logs to determine casing diameter and thickness; natural gamma ray logs to determine shale volume; open hole logs to determine lithology and other petrophysical properties; pressure measurements to determine borehole and formation fluid properties and gas densities.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method comprising:
   emitting neutrons into a subterranean formation from a downhole tool, such that inelastic gamma-rays are produced due to inelastic scattering in the subterranean formation and epithermal neutron capture gamma-rays are produced by epithermal neutron capture in the subterranean formation;
   using a first scintillator to detect a portion of the inelastic gamma-rays and a portion of the epithermal neutron capture gamma-rays that scatter back to the downhole tool to obtain an inelastic gamma-ray signal; and
   determining a property of the subterranean formation based at least in part on the inelastic gamma-ray signal from the first scintillator, wherein the inelastic gamma-ray signal is corrected to account for the portion of the epithermal neutron capture gamma-rays such that the inelastic gamma-ray signal is substantially free of epithermal neutron capture background due to epithermal neutron capture in the subterranean formation.

2. The method of claim 1, wherein detecting the portion of the inelastic gamma-rays comprises detecting a count of the inelastic gamma-rays to obtain the inelastic gamma-ray signal.

3. The method of claim 1, wherein the portion of the inelastic gamma-rays are detected using a scintillator crystal consisting essentially of one or more elements with a resonance integral of less than or equal to approximately 12 barns.

4. The method of claim 3, wherein the portion of the inelastic gamma-rays are detected using a scintillator crystal comprising YAP, BGO, or a lanthanum-halide, or any combination thereof.

5. The method of claim 1, wherein determining the property of the subterranean formation comprises determining, in a processor, a value of porosity of the subterranean formation, a value of gas saturation of the subterranean formation, or values of both porosity and gas saturation of the subterranean formation.

6. A downhole tool comprising:
a neutron source capable of emitting neutrons into a subterranean formation such that the neutrons inelastically scatter to produce inelastic gamma-rays;
a first gamma-ray detector comprising a first scintillator crystal capable of detecting the inelastic gamma-rays;
a first gamma-ray shield comprising one or more elements with a resonance integral of greater than 4 barns; and
a second gamma-ray shield disposed between the first gamma-ray detector and the first gamma-ray shield, wherein the second gamma-ray shield is configured to shield the first gamma-ray detector from epithermal neutron capture gamma-rays emitted by the first gamma-ray shield, wherein the second gamma-ray shield consists essentially of one or more elements with a resonance integral of less than approximately 4 barns.

7. The downhole tool of claim 6, wherein the scintillator crystal consists essentially of one or more elements with a resonance integral of less than or equal to approximately 12 barns.

8. The downhole tool of claim 7, wherein the scintillator crystal comprises YAP.

9. The downhole tool of claim 7, wherein the scintillator crystal comprises a lanthanum halide material.

10. The downhole tool of claim 6, wherein the scintillator crystal is contained in a scintillator housing consisting essentially of one or more elements having a resonance integral of less than or equal to approximately 1 barn.

11. The downhole tool of claim 6, wherein the scintillator crystal is contained within a thermal neutron shield.

12. The downhole tool of claim 11, wherein the thermal neutron shield comprises $^6$Li.

13. The downhole tool of claim 6, wherein the first gamma-ray shield comprises one or more elements having a resonance integral of greater than 100 barns.

14. The downhole tool of claim 13, wherein one of the one or more elements having the resonance integral of greater than 100 barns comprises tungsten.

15. The downhole tool of claim 6, comprising a second gamma-ray detector comprising a second scintillator crystal capable of detecting the inelastic gamma-rays, wherein the first gamma-ray shield is disposed between the first gamma-ray detector and the second gamma-ray detector; and
a second epithermal neutron capture gamma-ray shield disposed between the second gamma-ray detector and the first gamma-ray shield, wherein the second epithermal neutron capture gamma-ray shield is configured to shield the second gamma-ray detector from epithermal neutron capture gamma-rays emitted by the first gamma-ray shield, wherein the second epithermal neutron capture gamma-ray shield consists essentially of one or more elements with a resonance integral of less than approximately 4 barns.

16. The downhole tool of claim 6, comprising a $^3$He neutron detector having a thermal neutron shield, wherein the thermal neutron shield contains cadmium.

17. A system comprising:
a downhole tool comprising:
an electronic neutron source configured to emit a periodic burst of neutrons into a subterranean formation; and
a scintillation detector configured to detect a count of gamma-rays over time while and after the electronic neutron source emits the periodic burst of neutrons; and
data processing circuitry configured to receive the count and to determine a subset of the count that includes substantially only inelastic gamma-rays produced by inelastic scattering of the emitted neutrons with the subterranean formation based on when the gamma-rays were detected in relation to when the periodic burst of neutrons occurred, wherein the inelastic gamma-ray signal is substantially free of epithermal neutron capture background due to epithermal neutron capture in the subterranean formation.

18. The system of claim 17, wherein the data processing circuitry is configured to determine the subset of the count based at least in part on an exponential function fitted to at least two time intervals of the count corresponding to times when the electronic neutron source is not emitting the periodic burst of neutrons.

19. The system of claim 17, wherein the data processing circuitry is configured to determine the subset of the count based at least in part on an exponential function fitted to a time interval of the count corresponding to a time when the electronic neutron source is emitting the periodic burst of neutrons.

20. A method comprising:
receiving, in a processor, a first signal proportionate to a detected quantity of inelastic gamma-rays produced by inelastic scattering of neutrons in a subterranean formation;
receiving, in the processor, a second signal proportionate to a hydrogen index of the subterranean formation; and
determining, in the processor, a value of porosity of the subterranean formation, a value of gas saturation of the subterranean formation, or values of both porosity and gas saturation of the subterranean formation, based at least in part on the first signal and the second signal, wherein the first signal comprises an inelastic gamma-ray count having substantially no epithermal neutron capture background due to epithermal neutron capture in the subterranean formation.

21. The method of claim 20, wherein the first signal comprises a ratio of inelastic gamma-ray counts detected by a far scintillation detector and a near scintillation detector, wherein the near scintillation detector is disposed more closely to a source of the neutrons than the far scintillation detector.

22. The method of claim 20, wherein the first signal comprises a logarithm of count rates of inelastic gamma-rays.

23. The method of claim 20, wherein the second signal comprises a count rate of neutrons detected from a neutron detector.

24. The method of claim 20, wherein the second signal comprises a signal proportionate to a count of a detected quantity of thermal neutron capture gamma-rays, epithermal neutron capture gamma-rays, or both thermal neutron capture gamma-rays and epithermal neutron capture gamma-rays.

25. The method of claim 20, wherein the second signal comprises a signal proportionate to the ratio of a count of a detected quantity of thermal neutron capture gamma-rays, epithermal neutron capture gamma-rays, or both thermal neutron capture gamma-rays and epithermal neutron capture gamma-rays from a first gamma-ray detector and from a second gamma ray detector, wherein the two detectors are at two different axial spacings from the neutron source.

* * * * *